(12) United States Patent
Crolley

(10) Patent No.: US 11,519,734 B2
(45) Date of Patent: Dec. 6, 2022

(54) FACILITY MANAGEMENT BASED ON CUMULATIVE DEVICE LOCATION DATA

(71) Applicant: AT&T Intellectual Property I, L.P., Atlanta, GA (US)

(72) Inventor: C. Wayne Crolley, Bryant, AR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 317 days.

(21) Appl. No.: 16/836,416

(22) Filed: Mar. 31, 2020

(65) Prior Publication Data

US 2021/0302167 A1 Sep. 30, 2021

(51) Int. Cl.
*G01C 21/20* (2006.01)
*G01S 19/45* (2010.01)
*G01C 5/06* (2006.01)

(52) U.S. Cl.
CPC .......... *G01C 21/206* (2013.01); *G01C 5/06* (2013.01); *G01S 19/45* (2013.01)

(58) Field of Classification Search
CPC ......... G01C 5/06; G01C 21/206; G01S 19/14; G01S 19/45
See application file for complete search history.

(56) References Cited

U.S. PATENT DOCUMENTS

| | | |
|---|---|---|
| 10,051,434 B2 | 8/2018 | Chang et al. |
| 2007/0229350 A1 | 10/2007 | Scalisi et al. |
| 2009/0164115 A1 | 6/2009 | Kosakowski et al. |
| 2010/0318293 A1 | 12/2010 | Brush et al. |
| 2012/0056741 A1 | 3/2012 | Zhu |
| 2013/0297198 A1* | 11/2013 | Vande Velde .......... G01C 21/32 701/409 |
| 2015/0006100 A1 | 1/2015 | Jackson et al. |
| 2015/0133145 A1* | 5/2015 | Palanki .................. G01C 25/00 455/456.1 |
| 2015/0204679 A1 | 7/2015 | Aist et al. |
| 2016/0047649 A1 | 2/2016 | Edge et al. |

(Continued)

OTHER PUBLICATIONS

S. Chen, M. Li, K. Ren and C. Qiao, "Crowd Map: Accurate Reconstruction of Indoor Floor Plans from Crowdsourced Sensor-Rich Videos," 2015 IEEE 35th International Conference on Distributed Computing Systems, 2015, pp. 1-10, doi: 10.1109/ICDCS.2015.9.*

(Continued)

*Primary Examiner* — Jeff A Burke
*Assistant Examiner* — Blake A Wood
(74) *Attorney, Agent, or Firm* — Guntin & Gust, PLC; Ralph Trementozzi

(57) ABSTRACT

Aspects of the subject disclosure may include, for example, a process that determines a current location of a mobile device according to a horizontal reference, obtains a corresponding barometric pressure reading at the current location of the mobile device, and determines a current position of the mobile device according to the current location of the mobile device and the corresponding barometric pressure reading. A historical record of positions of the mobile device is updated according to the current position of the mobile device and other positions of the mobile device determined at other times, and a historical record of positions of the mobile device to a map of a facility is updated to obtain a referenced pattern of movement of the mobile device within the facility. Other embodiments are disclosed.

20 Claims, 10 Drawing Sheets

(56) References Cited

U.S. PATENT DOCUMENTS

| | | | |
|---|---|---|---|
| 2016/0123740 | A1 | 5/2016 | Poornachandran et al. |
| 2016/0245716 | A1 | 8/2016 | Gum et al. |
| 2016/0258749 | A1 | 9/2016 | Macgougan et al. |
| 2018/0091933 | A1 | 3/2018 | Ling |
| 2018/0252521 | A1 | 9/2018 | Dormody et al. |
| 2019/0172165 | A1* | 6/2019 | Verteletskyi ..... G06Q 10/06315 |
| 2019/0353488 | A1 | 11/2019 | Kitchel |
| 2019/0360804 | A1 | 11/2019 | Dormody et al. |
| 2021/0025717 | A1* | 1/2021 | Mendez ................... G06T 7/70 |
| 2021/0325179 | A1 | 10/2021 | Meredith et al. |

OTHER PUBLICATIONS

H. Shin and H. Cha, "Wi-Fi Fingerprint-Based Topological Map Building for Indoor User Tracking," 2010 IEEE 16th International Conference on Embedded and Real-Time Computing Systems and Applications, 2010, pp. 105-113, doi: 10.1109/RTCSA.2010.23.*

Use your iPhone 6 as a backup altimeter, https://ipadpilotnews.com/2014/10/use-iphone-6-backup-altimeter; Oct. 17, 2014, 2 pp.

Bauereiss, Steffen, Barometer & Altimeter Pro, https://appgrooves.com/ios/923043780/barometer-and-altimeter-pro/steff; Feb. 26, 2020, 7 pp.

Falcon, William et al., Predicting Floor-Level for 911 Calls With Neural Networks and Smartphone Sensor Data, Columbia University, Undated, 1 page. downloaded from the Internet on Jan. 7, 2020.

Pipelidis, Georgios et al., Dynamic Vertical Mapping with Crowdsourced Smartphone Sensor Data, Sensors 2018, 18, 480; doi:10.3390/s18020480, pp. 1-25.

Waddell, Kaveh, How Phones Can Help Predict Thunderstorms, The Atlantic, Aug. 11, 2016, pp. 1-10.

* cited by examiner

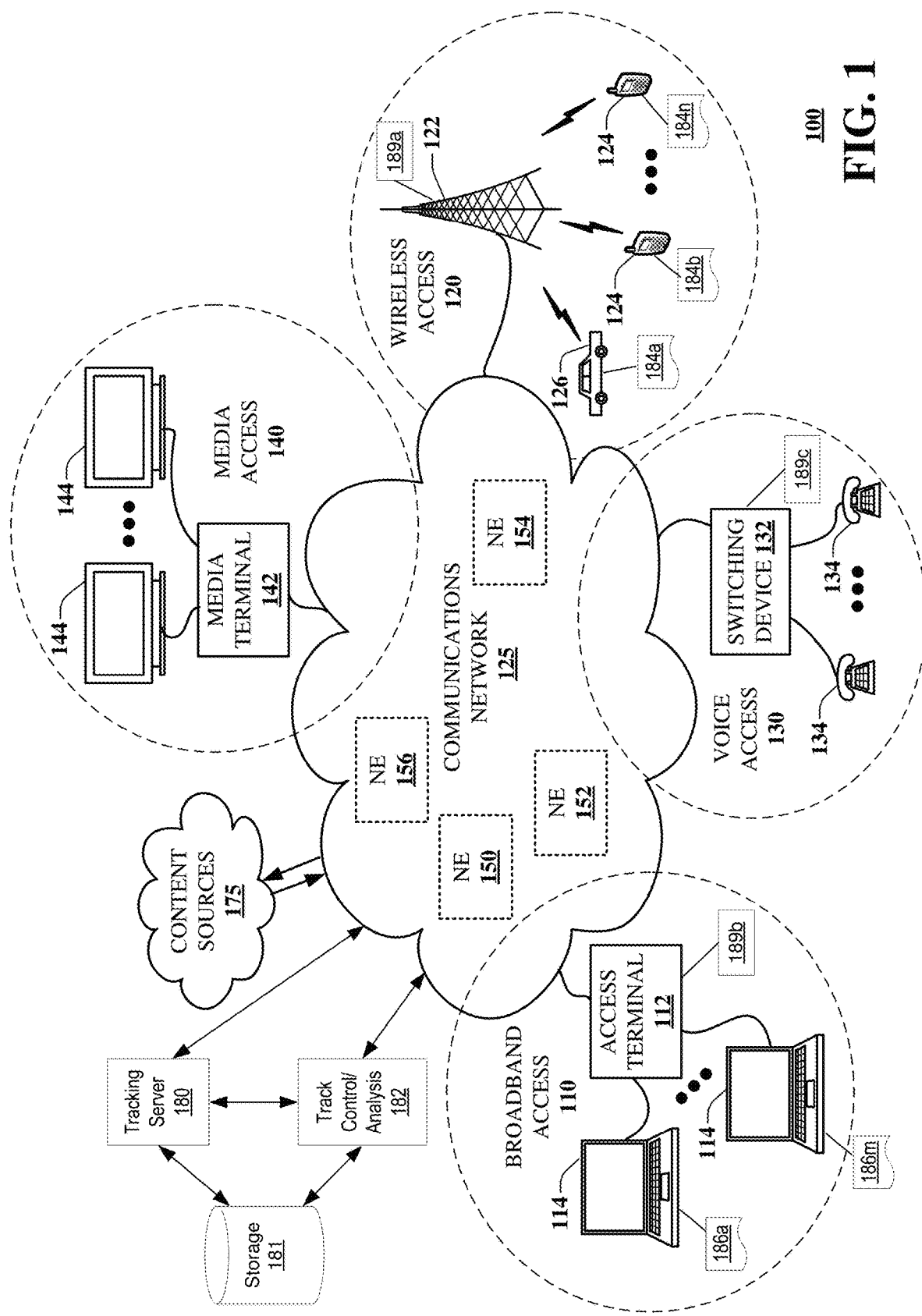

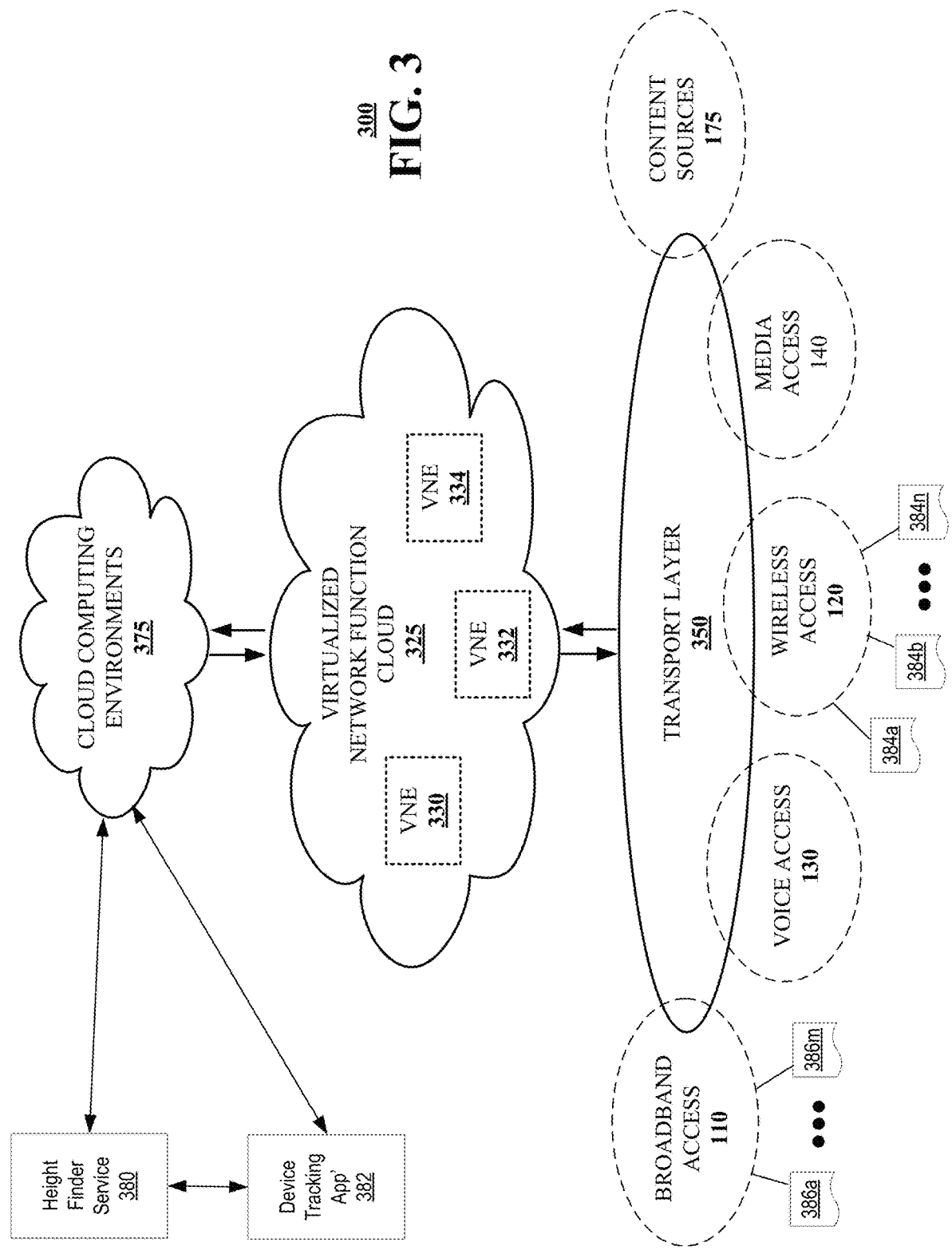

FACILITY MANAGEMENT BASED ON CUMULATIVE DEVICE LOCATION DATA

FIELD OF THE DISCLOSURE

The subject disclosure relates to a facility management based on cumulative device location data.

BACKGROUND

At least some mobile devices may be equipped with location receivers, such as GPS receivers, that are adapted to determine locations of the devices. Many such devices may also be equipped with navigational software or apps that can operate in cooperation with the location receiver to facilitate navigation and/or planning navigation. For example, a navigation app may accept user input in the form of destinations and/or waypoints along a planned route in association with a map, such as a topological map, a street map and/or satellite imagery.

A navigation app may be adapted further to record a historical record of locations of a device as it moves through its environment. Such location records are sometimes referred to as digital breadcrumbs or track points that may have been recorded at regular intervals. Historical records can be used to trace or otherwise plot movement of the device, e.g., in a form of a graphical record, or track, in which the recorded locations can be interconnected to form a track or trace representative of prior movement of the device. Traces of these sorts may be referenced by a user at a later time to retrace their steps and/or to evaluate the path traveled, e.g., according to one or more of distance or time, and in at least some instances, elevations.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
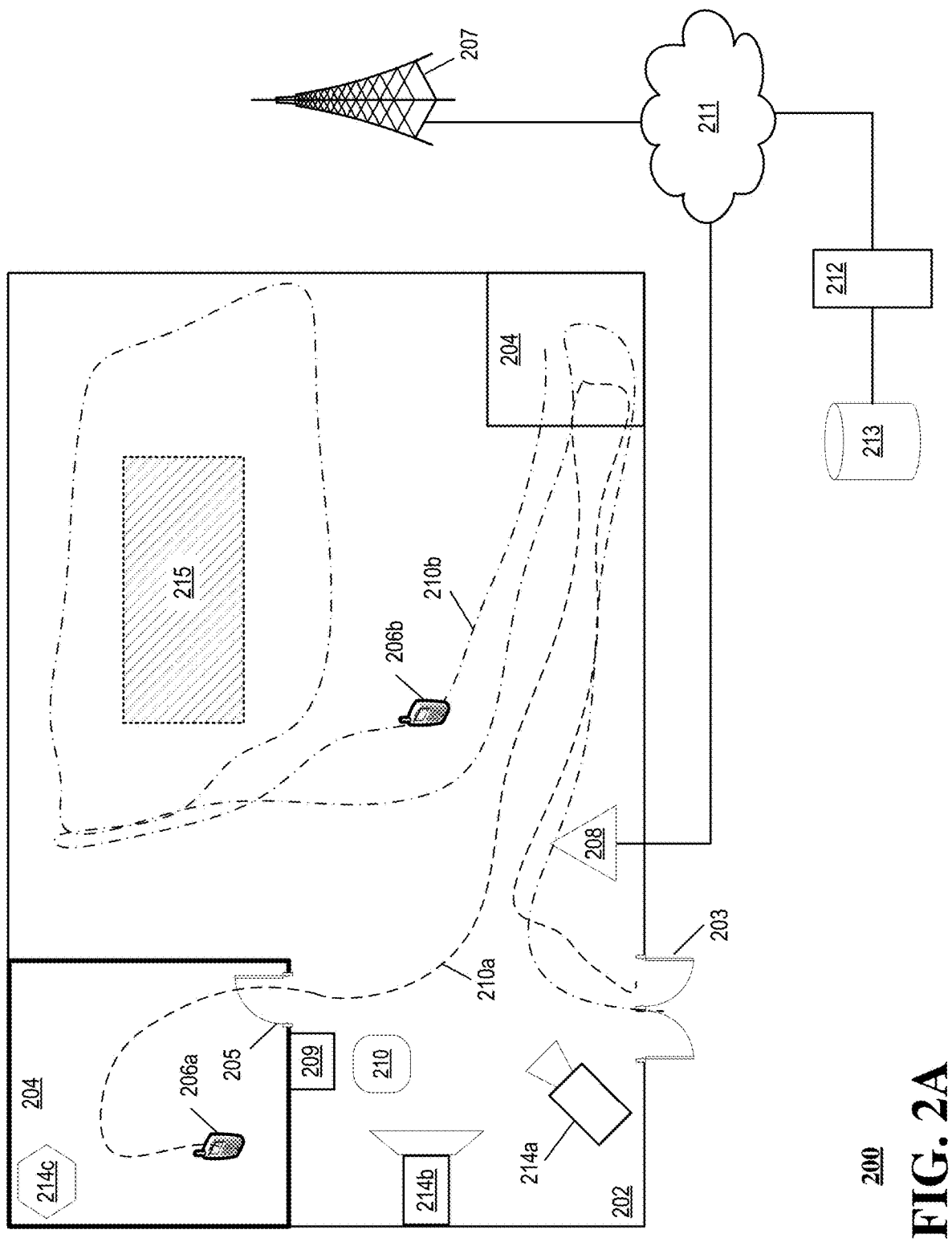
FIG. 2A is a block diagram illustrating an example, non-limiting embodiment of a pedestrian tracking system functioning within the communication network of FIG. 1 in accordance with various aspects described herein.

The subject disclosure describes, among other things, illustrative embodiments for performing tracking of pedestrian traffic according to mobile device position data in combination with barometric pressure readings. The position information can be determined as the mobile device moves to obtain an ordered sequence of positions, sometimes referred to as "breadcrumbs." The resulting positions can be processed to identify plots, traces or tracks that can be compared with a facility to evaluate pedestrian traffic within the facility.

One or more aspects of the subject disclosure include a device, including a processing system having a processor and a memory that stores executable instructions that, when executed by the processing system, facilitate performance of operations. The operations include determining a mobile device is within a boundary of a facility. Responsive to the mobile device being within the boundary of the facility, a current location of a mobile device is determined according to a horizontal reference plane. A corresponding ambient barometric pressure reading is obtained at the current location of the mobile device, wherein the corresponding ambient barometric pressure reading is obtained coincidentally with the determining of the current location. A current three-dimensional (3D) position of the mobile device is determined according to the current location and the corresponding ambient barometric pressure reading, and the current 3D position of the mobile device is combined with other 3D positions of the mobile device, determined at other times, to obtain a historical record of positions of the mobile device. The historical record of positions of the mobile device is combined with a map of the facility to obtain a pattern of movement of the mobile device within the facility.

One or more aspects of the subject disclosure include a process that includes determining a current location of a mobile device according to a horizontal reference, obtaining a corresponding barometric pressure reading at the current location of the mobile device, and determining a current position of the mobile device according to the current location of the mobile device and the corresponding barometric pressure reading. A historical record is updated of positions of the mobile device according to the current position of the mobile device and other positions of the mobile device determined at other times. The historical record of positions of the mobile device is referenced to a map of a facility to obtain a referenced pattern of movement of the mobile device within the facility.

One or more aspects of the subject disclosure include a non-transitory, machine-readable medium, includes executable instructions that, when executed by a processing system including a processor, facilitate performance of operations. The operations include determining a location of a device, obtaining an atmospheric pressure reading at the location of the device, and determining a position of the device according to the location of the device and the atmospheric pressure reading. A historical record of positions of the device according to the position of the device is updated and combined with a map of a facility to obtain a pattern of movement of the device within the facility.

As smart devices are equipped with more accurate location determination components, and with the inclusion of a barometer on certain smart phones, new types of data can be collected offering insights in new areas. This submission proposes to use data collected from GPS and barometric-sensor enabled smart phones to collect historical data of pedestrian traffic, create three-dimensional (3D) maps of this pedestrian traffic in a specified area, and draw from this data certain insights, such as identifying space within a building that is not accessed, and from that, extract causes such as: unused office space that shows a possible need for redesigning the floor plan, that the floor can accommodate more people, or that occupants assigned a certain section of a floor are not using the space (not coming into the office). As an extreme example, a lack of pedestrian traffic in a specific area over an extended period of time might indicate an unknown or "hidden" room.

It is anticipated that location determination technology and mapping technology will become more sophisticated, allowing for a more accurate mapping of locational information, which in combination with the techniques disclosed herein, is expected to yield even more insights than is currently available. As accuracy increases, so would the level of detail and subsequent insights drawn from that data.

Referring now to FIG. 1, a block diagram is shown illustrating an example, non-limiting embodiment of a communications network 100 in accordance with various aspects described herein. For example, communications network 100 can facilitate in whole or in part determination of a reference atmospheric pressure grid at a reference elevation, e.g., mean sea-level, based on crowd-sourced pressure readings from mobile devices of opportunity. In at least some embodiments, the communication network 100 can further facilitate in whole or in part determination of a location of a mobile device, including a floor location in a multi-story structure, based on a device reported location and pressure reading, in reference to the crowd-sourced pressure readings. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on). It is envisioned that in at least some examples, network infrastructure, such as one or more of access points, repeaters, cell towers, data centers and the like may be equipped with environmental sensors, such as barometric pressure sensors. Since at least some of such network infrastructure may be deployed in a fixed manner, any pressure readings obtained therefrom may be associated with a known, e.g., predetermined or surveyed height above mean sea level. Pressure readings obtained from one or more such network infrastructure sensors can be used, e.g., as references, to facilitate a determination of reference pressures, which may be interpolated and/or extrapolated to one or more locations according to a reference pressure grid.

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, the example system 100 includes a location determining application server, e.g., a track controller and/or analysis server 182. The track controller and/or analysis server 182 can be in communication with one or more mobile devices 124, 126 and/or static devices, e.g., 114, and/or one or more other reference sensors 189a, 189b, 189c, generally 189. The track controller and/or analysis server 182 can be adapted, e.g., include machine readable instructions that when executed by a processing system including a processor facilitate in whole or in part operations that obtain location information and/or sensor information associated with one or more mobile devices and/or process such location and/or sensor information to generate historical records of movement of one or more mobile devices. The records can be stored according to one or more of tabulated records, graphical records or any suitable data structure adapted to retain a historical record of a position, e.g., movement, of one more mobile devices 124, 126.

The example system 100 includes a track controller and/or track analyzer, referred to herein as a track controller and/or analysis 182 adapted, to control a recording of mobile device location related data, e.g., position data, sensor data, such as atmospheric pressures and/or locations determined by other systems, such as by the mobile devices 124, 126, by a network service provider 122, by fixed devices 114, by one or more network elements 150, 152, 154, 156, and the like. For example, a track controller and/or analysis server 182 may include machine readable instructions that when executed by a processing system including a processor facilitate in whole or in part operations that determine a position sampling interval, locations to be monitored, devices to be monitored, rules for monitoring, e.g., according to a number of devices exceeding a threshold number of devices, according to device locations, speeds, elevations, bearings, directions, motion patterns, proximity to one or more identified features of a particular facility, and so on.

In at least some embodiments, the tracking track controller and/or analysis server 182 is adapted to analyze and/or facilitate an analysis process according to one or more of the position data, sensor data, such as atmospheric pressures and/or locations determined by other systems, such as by the mobile devices 124, 126 and/or the tracking server 180. By way of example, the track controller and/or analysis server 182 includes machine readable instructions that when executed by a processing system including a processor facilitate in whole or in part operations that evaluate tracks obtained by the tracking server 180. Analysis can include, without limitation, evaluating individual tracks according to predetermined parameters, such as proximity to other environmental features, e.g., secure rooms, doors, windows, stairs, elevators, escalators, identities of user's and/or devices associated with the tracks, track proximity to other tracks, time associated with tracks, extent or distance of tracks, movement patterns suggested by the tracks, elevation of the tracks, elevation changes of the tracks, determined floors of multi-story buildings, and so on. Analysis results may be displayed at a user interface, e.g., at a display of a controller terminal, or a display of a mobile device, e.g., any of the example mobile devices 124, 126, at a display of a remote system, e.g., any of the fixed devices 114, at media display devices 114, and the like. Alternatively or in addition, analysis results may be stored, e.g., in the storage system 181, for subsequent inspection, evaluation or analysis.

The references sensors 189 can include, without limitation barometric pressure sensors, barometers, anemometers, thermometers, and any other weather sensing devices or systems. Alternatively or in addition, the reference sensors 189 can include one or more of a still camera, a video camera, a panoramic or 360 degree camera, a motion sensor, a light sensor, a vibration sensor, an accelerometer, and the like. The reference sensors may be adapted to collect sensed information that indicates a reference measurement, e.g., a baseline atmospheric pressure that can be used in combination with location and/or sensor information obtained from the mobile devices 124, 126, the fixed devices 114 to facilitate a determination of one or more of a position, an altitude or elevation, a direction or bearing, a speed of the devices 114, 124, 126. The reference sensors 189 may report sensed information independently or collectively according to one or more different sensors 189 and/or according to one or more classes of sensors 189. Information may be reported to one or more of the stationary devices 114, the mobile devices 124, 126, the tracking server 180 or the trach controller and/or analysis server 182.

The example system 100 includes a storage device or system 181 in communication with the tracking server 180, with the track controller and/or analysis server 182, or with both. One or more of the tracking server 180, the track controller and/or analysis server 182, or the storage device 181 may be collocated, or remotely located. Communication connectivity between one or more of the tracking server 180, the track controller and/or analysis server 182 or the storage system 181 may be accomplished by one or more wired local connections, e.g., a system bus, a data cable, and the like. Alternatively or in addition, communications connectivity can be accomplished by a network connection, including any of the networking technologies disclosed herein or otherwise known by those skilled in the art. Example network connections include, without limitation, local area network connections, metropolitan area connections and wide area connections, e.g., the Internet. Network connectivity may be wired, wireless, or any combination thereof. The storage system 181 can include any suitable storage device, such as the various storage devices disclosed herein or generally known to those skilled in the art. Example storage systems 181 include, without limitation, a hard drive, a random-access memory (RAM) storage device, e.g., a flash drive, a data base system, networked storage, cloud storage, and the like.

In at least some embodiments, the tracking controller and/or analysis server 182 can be adapted to determine a reference atmospheric pressure grid at a reference elevation, e.g., mean sea-level, based on reference atmospheric pressure measurements obtained from one or more reference pressure sources, a weather reporting service, and/or according to crowd-sourced pressure readings obtained from mobile devices of opportunity according to the various techniques disclosed herein. Likewise, in at least some embodiments, such as the example system 100, a location server, illustrated as a tracking server 180 is in communication with one or more mobile devices 124, 126 and/or static devices, e.g., 114, and/or other components of the communication network 125, e.g., one or more of the network elements 150, 152, 154, 156. The tracking server 180 can be adapted to facilitate in whole or in part determination of a height of a mobile device, including its floor location in a multi-story structure, based on a device reported location and pressure reading, in reference to the crowd-sourced pressure readings.

In at least some embodiments, the mobile devices include location determining functionality 184a, 184b, . . . 184n, generally 184, e.g., in the form of any one of an operating system, a client, a resident app, and combinations thereof. The resident functionality can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on.

Likewise, the stationary devices 114 can be adapted with functionality 186a . . . 186m, generally 186, in the form of any one of an operating system, a client, a resident app, and combinations thereof. The resident functionality 186 can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on. In some embodiments, the stationary devices 114 can include network enabled devices, such as smart appliances, and the like implementing machine-type communications. It is envisioned that one or more stationary devices 114 can be adapted to determine their location and/or otherwise be associated with a fixed and generally known installation location. To the extent the stationary devices 114 are adapted to measure pressure, they are available to participate in one or more of the various techniques disclosed herein, including determining reference pressure grid, and determining heights of devices based on the reference pressure grid.

FIG. 2A is a block diagram illustrating an example, non-limiting embodiment of a facility management system 200 based on cumulative location data obtained from one or more mobile devices. The system 200 may operate in reference to a facility, such as a building, a park, an arena, a campus of multiple buildings and/or a building and surrounding grounds. It is conceivable that the facility may include, without limitation, a public facility, such as a public park, a public street, a public sidewalk, a pedestrian trail. For illustration purposes, the facility includes a building 202 depicted as a simple rectangle having four walls and one entry door 203. The building 202 also includes an interior secure room 204 enclosing a subspace that may be accessed from within the building 202, e.g., via an interior access doorway 205. Also depicted in the illustration are two mobile devices 206a, 206b, generally 206. The mobile devices 206 may include, without limitation, smart phones, smart watches, smart glasses, e.g., virtual reality goggles and/or augmented reality goggles, tablet devices, laptops, fitness tracking devices, network-enabled apparel, otherwise referred to as smart garments, and the like. In at least some instances, the mobile devices 206 may be held by a user, e.g., within a hand or pocket, or worn by the user as in an accessory or apparel.

In at least some applications is envisioned that the mobile devices 206 may be utilized by mechanized devices, e.g., robotic devices adapted to move about the facility. Example devices may include, without limitation, cleaning devices, e.g., robotic broom or vacuum, material handlers adapted to move material about the facility and/or security devices, e.g., adapted to roam about the facility to monitor security. In such applications, the mobile devices 206 may be provided as an integral part of the robot. Alternatively or in addition, the mobile devices 206 may be attached to or otherwise placed upon or secured to the robot device, such that the mobile device 206 generally moves according to movement of the individual user or robot.

The mobile devices 206 may include a location determining module, subsystem or device adapted to determine or otherwise estimate a location of the mobile device 206. Examples include, without limitation, a GPS receiver as may be include in a smart phones, an inertial navigation or reference system adapted to infer or otherwise solve for a position as a function of movement, e.g., displacement, direction, and/or acceleration of the mobile device. Still other location determining modules may include location reference systems adapted to determine a location of the device according to a reference measurement to one or more other reference markers. Such reference systems may rely upon vision systems adapted to recognize environmental references, e.g., markers. Alternatively or in addition, the location reference systems may perform distance measurements, e.g., using radio frequency measurements (RADAR), optical measurements (LIDAR), acoustic measurement (SONAR) and the like.

In at least some embodiments, the location reference system may rely upon one or more external systems, such as a wireless network and/or other mobile devices, other location reference systems, other sensor systems, e.g., security systems, weather detection and/or reporting systems, and so on. For example, a wireless network, such as a mobile cellular network may be adapted to estimate distances and/or bearings from one or more reference points, such as cell towers 207, micro cells, picocells, femtocells, wireless access points 208 to the mobile device 206. The distance and/or bearing measurements can be processed or otherwise evaluated to determine an approximate location of the mobile device. Such processing may be performed by a location reference system client at the mobile device 206 and/or at a remote system, such as a cellular base station, a cellular core network, or a network accessible server.

According to the illustrative example, the interior room 204 defines or otherwise encloses a secure space. Such a secure room may include an access control mechanism 209 adapted to permit access to authorized personnel, and to prevent access to unauthorized personnel. Examples of such access control mechanisms 209 include, without limitation, keypad devices, card readers, e.g., optically reading a bar code, QR code or similar device on an item possessed by authorized users. Alternatively or in addition, the access control mechanism 209 may include a radio frequency identification (RFID) interrogator, a magnetic sensor, a near-field sensor, and the like, e.g., to interrogate a user ID card 210 or FOB. Still other examples may include biometric sensors adapted to obtain biometric data, such as fingerprints, voice recognition, retinal scan, and the like.

The access control mechanism 209 may be further adapted to permit or deny access to the secure room 204 according to authorization data obtained from a user and/or equipment of the user. For example, the access control mechanism 209 may include authorization records of authorized users, such that access may be granted upon a match between the authorization data and the authorization records. Alternatively or in addition, the access control mechanism 209 may be in communication with an access control system or server that may be collocated at the building, e.g., a central security system, and/or remote, e.g., an access control server of an authorization entity. When a match has been determined to satisfy authentication, the access control mechanism 209 can initiate an action, such as permitting access, initiating a trigger, an update to a security log, and the like.

In some embodiments, when a match has been determined to satisfy authentication, the access control mechanism 209 further evaluates a mobile device track, trace and/or location record. For example, mobile device track records can be generated based on position and/or barometric pressure readings obtained from the mobile device. The track records can be associated with a device identifier, such as an International Mobile Equipment Identity (IMEI) value or number unique to the particular device. Other records, e.g., obtained and/or otherwise maintained and/or provided by a mobile service provider may associate one or more individuals with a device according to its device identifier. Accordingly, the access control mechanism may compare track information to identify a mobile device in a vicinity of the access control mechanism 209 and/or the secure room at or around a time at which an authorization process was initiated via the access control mechanism.

To the extent a user identity obtained via the IMEI of a proximal track agrees with other authentical records, e.g., such as those obtained via the access control mechanism, authorization can be established and/or otherwise verified. Access may be granted upon such verification. Alternatively, to the extent a user identity obtained via the IMEI of a proximal track does not agree with the other authentical records, authorization and/or access may be denied and/or at least delayed until further verification is obtained. For example, upon determining a mismatch, a supplemental authorization process may be employed, such as examination of video monitoring of the individual attempting to gain access to the secure room 204, dispatch of a security officer, initiation of multifactor authentication, e.g., requesting further input from the user and/or confirmation via the mobile device. For example, upon detection of a mismatch a text may be sent to the user's mobile device providing a temporary code. A user receiving the temporary code may enter it in an app on their mobile device and/or via the access control mechanism 209.

It is common for mobile devices 206 to be equipped with some form of a location determination function adapted to determine an approximate location of the mobile device 206. Such locations, once determined, may be used by applications, such as map services, resident on the mobile devices 206. Alternatively or in addition, locations can be reported to mobile network operators, e.g., to manage resources, and/or to other back end systems and/or services. By way of example, at least some of the mobile devices 206 may include a global positioning system (GPS) receiver adapted process GPS signals to determine an approximate location of the mobile device on the Earth. Alternatively or in addition, the location receiver may use signals of availability to triangulate its position in reference to fixed radio sources, such as the radio systems 206. Triangulation calculations may be performed on the mobile device 206, by the mobile network operator, e.g., by cell towers 207 and/or access points 208, and any combination thereof.

Locations, once determined, may be provide according to a coordinate system, such as a geocoordinate system, a map of a facility, and the like. Each location provides a position, e.g., a horizontal position as in a latitude-longitude of the mobile device 206, according to a surface of the Earth, or a map, or a facility plan, and the like. At least some of the location determination functions provide vertical information, e.g., a height or elevation alone or in combination with the horizontal position. It is generally understood, however, that elevation or height information obtained from such systems is determined to a much lower precision, which may not sufficient for many applications, and particularly those used to locate a height of the mobile device 206 to a particular floor of a multi-story building.

The locations, once determined can be associated with one or more of a device identifier, a user identifier, and/or a time at which the position was determined. Successive locations, e.g., according to successive time intervals, of a particular mobile device 206 can be interconnected or otherwise fitted or estimated by a curve, e.g., linear segments or curvilinear segments between successive locations, resulting in a plot, a trace or a track. According to the illustrative embodiment, the first mobile device 206a is associated with a first track 210a and the second mobile device 106b is associated with a second track 210b. The tracks 210a, 210b, generally 210 can be associated with the facility, i.e., the building 202, to provide an indication of movement of the devices within the building 202.

In some embodiments, the traces 210 can be examined, evaluated or otherwise assessed with respect to the facility. For example, traces can be filtered according to one or more of user identities, equipment identifiers, time periods, motion patterns, floors, activity levels, and the like. Such filtered results may be provided for presentation on a display device, e.g., presented as traces in association with a graphical representation of the facility. In some embodiments, cumulative trace results are evaluated to determine traffic patterns, traffic intensity, potential congestion points, and the like. In some embodiments, cumulative traces are evaluated to determine locations within the facility particularly devoid of traffic. Further analysis can be performed, e.g., comparing such un travelled areas to features of the facility, such as floor plan.

In at least some embodiments, the comparison can be further evaluated to determine any anomalous results. For example, such areas devoid of tracks include areas may be expected or otherwise understandable if they correspond to heating ventilation and air conditioning (HVAC) ducts, cable raceways, chimneys, closets, equipment rooms, and the like, that are expected to experience little no traffic. Alternatively, an anomalous condition may be identified if the areas devoid of tracks do not correspond with any facility features that would otherwise logically result in little or no traffic. In at least some embodiments, such areas can be identified, logged, cataloged and/or otherwise presented for further analysis. Analysis may include an inference, such as a possibility that the areas correspond to a hidden space, hidden room, or otherwise undiscovered space. The system may initiate further action responsive to such inferences, e.g., requesting a site survey to inspect and/or otherwise validate an inference.

The example system 200 includes a network 211 supporting communications between one or more components of the system, such as the mobile cellular service provider, e.g., via a core network gateway and/or base transceiver station of a cell tower 207, between the one or more wireless access points 208, between the access control device 209, and/or between one or more servers 212 and/or storage devices or systems 213. The servers 212 can include, with out limitation, the tracking server 180 (FIG. 1), the track control/analysis server 182 (FIG. 1), an access control server, a security monitor server, and the like. In some embodiments, the building 202 includes one or more sensors 214a, 214b, 214c, generally 214, and/or security devices. Sensors can include, without limitation, cameras, microphones, accelerometers, temperature sensors, motion sensors, and the like.

In at least some embodiments, inputs from one or more of the sensors can be provided to one or more of the remote servers 212. For example, inputs from a camera and/or motion sensor may be compared with mobile device tracks to facilitate analysis of the tracks and/or to support supplementary action resulting form analysis of the tracks.

It is becoming more common for mobile devices 206, such as smart phones, to include environmental sensors, such as magnetic field sensors, inertial sensors, accelerometers, temperature sensors, light sensors, and barometric pressure sensors. As larger numbers of the mobile devices 206 include barometric pressure sensors, it becomes possible to obtain pressure readings from one or more devices and to process such readings. For example, according to the techniques disclosed herein, the pressure readings from a number of the mobile devices 206 can be obtained and processed to determine a barometric pressure at a common reference height, such as mean sea-level pressure (MSLP), which corresponds to an atmospheric pressure at mean sea level (PMSL). This can be accomplished despite the various mobile devices obtaining barometric pressure readings at their respective heights, none of which may be at the reference height. For example, such referencing of pressures can be accomplished according to well understood pressure-altitude relationships. An example equation below, referred to as the barometric formula, relates atmospheric pressure, p, to altitude, h:

$$P = P_b \cdot \left[ \frac{T_b}{T_b + L_b \cdot (h - h_b)} \right]^{\frac{g_0 \cdot M}{R^* \cdot L_b}}$$

Where $P_b$ is a static pressure (Pa), $T_b$ is a standard temperature (K), $L_b$ is a standard temperate lapse rate (K/m), h is a height above sea level (m), $h_b$ is a height at a bottom of a layer b (m), $g_0$ is gravitational acceleration (9.8065 m/x2) and M is a molar mass of Earth's air (0.0289644 kg/mol). The equation may be manipulated to solve for different quantities, such as solving for a height above sea level h, given a pressure reading of a device. In such applications, it is observed that pressure of a mobile device obtained at the device altitude may depend upon a static pressure at mean sea-level. As discussed in more detail herein, crowd sourced pressure readings obtained from the mobile devices 206 may be referenced to mean sea-level and combined to determine an average. According to weather patterns, the pressure at mean sea-level may vary depending upon location. Accordingly, the averaged results may be obtained at various locations according the mobile device 206 positions relative to a reference grid. Having obtained mean sea-level equivalent pressures for those devices providing measure results, the pressures can be associated with or otherwise mapped to the grid. In at least some embodiments, the referenced mean sea-level pressures are interpolated and/or extrapolated to the grid. Such interpolated/extrapolated results can be associated with one or more of grid centers and/or grid vertices.

Figure 2D:
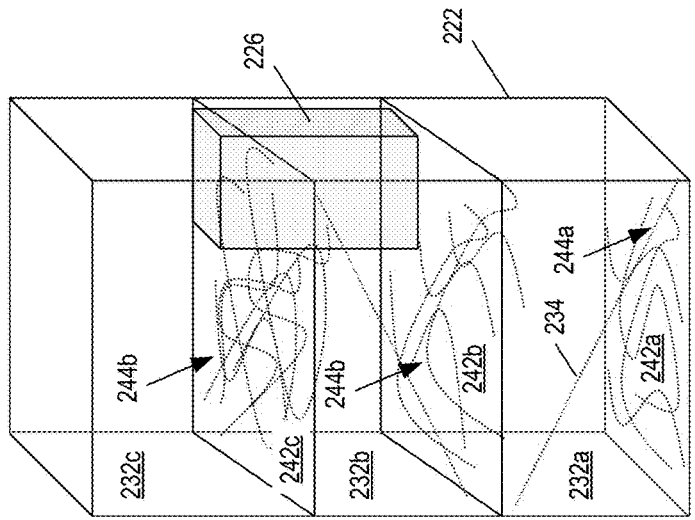
FIG. 2D is a perspective view illustrating an example, non-limiting embodiment of pedestrian tracks obtained according to the communication network of FIG. 1, and the pedestrian tracking system of FIG. 2A in accordance with various aspects described herein.
Figure 2C:
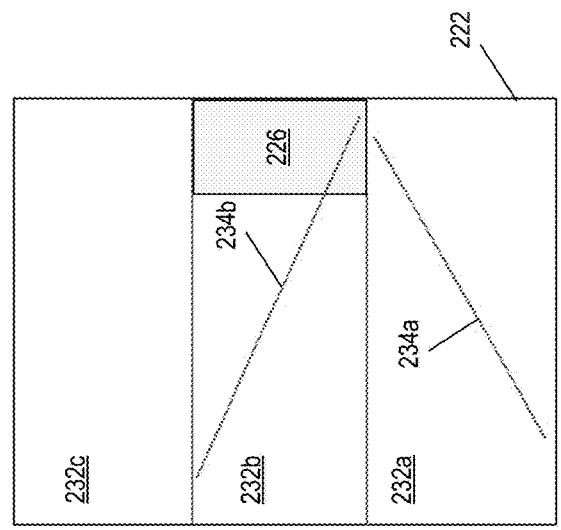
FIG. 2C is an elevation view illustrating an example, non-limiting embodiment of pedestrian tracks obtained according to the communication network of FIG. 1, and the pedestrian tracking system of FIG. 2A in accordance with various aspects described herein.
Figure 2B:
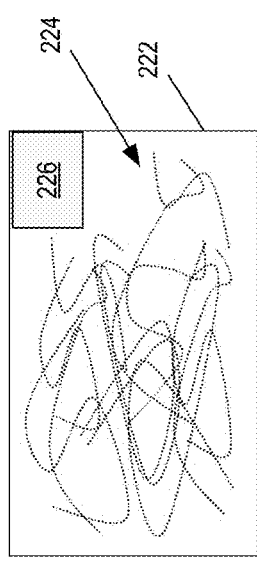
FIG. 2B is a planar view illustrating an example, non-limiting embodiment of pedestrian tracks obtained according to the communication network of FIG. 1, and the pedestrian tracking system of FIG. 2A in accordance with various aspects described herein.

FIG. 2B is a top-down, or planar view 220 of a building 222. The example view is from above and includes a map of pedestrian traffic within the building 222. This may include a view of pedestrian traffic of a particular floor of a multi-story building 222, of a group of floors that may be contiguous or not, and/or of all floors taken together. Each mapped "path" is linked to the IMEI of the user's cellular device. Visible within the building 222 are plots or traces 224 of a historical record of locations of mobile devices obtained over an extended time period, e.g., a sample period, or window. For mobile devices carried by individuals, the tracks can be representative of pedestrian traffic within the building 222 during the sample period. In at least some embodiments, the tracks are obtained according to the communication network of FIG. 1, and/or the pedestrian tracking system 200 of FIG. 2A in accordance with various aspects described herein.

For scenarios in which the building is a multi-story building, the planar view 220 may depict a single story. The single story may be a default story, such as a story associated with a particular tenant, lease, monitoring agreement, and the like. Alternatively or in addition, the single story may be selectable, e.g., according to input obtained at a user interface or similar control terminal. For example, a facility monitoring agent may select one or more stories of a facility being monitored, such that tracks of pedestrian traffic can be obtained for a predetermined sample window. The sample window may be determined according to predetermined schedule, e.g., daily, according to working hours, employee shifts, non-working hours, etc., and/or according to an input obtained from the user interface.

In at some embodiments, tracks of pedestrian traffic may be obtained over a first time period, sometimes referred to as a collection period, and culled for examination and/or display over a second time period, sometimes referred to an examination or analysis period. For example, the tracks may be obtained in a continuous manner and stored for subsequent examination. Examples of collection periods include continuous recordings from a time of installation and/or from a time of system power on, and/or from a reset time associated with a particular maintenance period, or any other time window as may be determined by choice, policy, storage capacity, and the like. Analysis periods may be associated with a user selected time window, such as a number of minutes, hours, days, weeks, months, and so on. In some embodiments, analysis periods correspond to business hours, shifts, non-business hours, and the like. Alternatively or in addition, analysis periods may be associated with a particular event or class of events, such as entry of a reporting mobile device within a particular building, and/or on a particular floor, and/or proximate to a predetermined area within a building, such as a room, or secure area, and the like.

It is understood that the track records can be associated with a time reference, e.g., a time at which they were obtained or otherwise recorded. In at least some embodiments, the individual location records, or "breadcrumbs" are stored in association with a time reference, such as the time at which they were obtained. Likewise, the tracks may be associated with a particular mobile device and/or a particular user. It is understood that recording of pedestrian traffic may be determined according to one or more of a time window and/or a device identity, class of devices, and/or user and/or equipment associated with such devices or cases of devices. For example, a recording policy and/or command may be configured to record all pedestrian traffic, or pedestrian traffic proximate to a particular area or region, or pedestrian traffic associated with a particular device or class of devices, or pedestrian traffic associated with a particular user, or any combination thereof.

It is understood that in at least some embodiments, a recording policy or command may be implemented according to one or more predetermined rules. For example, pedestrian traffic may be recorded if it subscribes to some predetermined characteristic or metric. Example characteristics and/or metrics include, without limitation, a particular extent of a track, a speed at which a track was made, shape of a track, proximity of a track to a feature of the facility, such as a secure or sensitive area. For example, if a user identity determined according to a mobile device identifier of a device producing a suspicious track is not authorized, further analysis and/or investigation may be initiated. Such analysis and/or investigation may include, without limitation, activation of a security monitoring system, activation and/or inspection of video monitoring systems, dispatch of a security guard, and the like.

FIG. 2C is an elevation view 230 of the building 222 illustrating an example, non-limiting embodiment of pedestrian tracks obtained according to the communication network of FIG. 1, and the pedestrian tracking system of FIG. 2A in accordance with various aspects described herein. The example multi-story building 222 includes three floors: a first story 232a, a second story 232b and a third story 232c. Also depicted is a first vertical track 234a extending between the first story 232a and the second story 232b, and a second vertical track 234b extending between the second story 232b and the third story 232c. It is understood that first and second vertical tracks 234a, 234b, generally 234, may be associated with the same mobile device or different mobile devise. In some embodiments, the vertical tracks 234 include multiple overlapping vertical tracks that are overlays of multiple different mobile devices that happen to travel along the same path, e.g., along the same staircase.

In some embodiments, the vertical tracks are determined according to elevation data measured and/or computed by the location receiver and/or a barometric sensor and/or an altimeter of the mobile device. Altitude or elevation can be determined in an absolute sense, e.g., converting a measured atmospheric pressure to an elevation above some reference, e.g., sea level and/or ground level of a proximal topology of the facility, e.g., ground level of the building 222. In some embodiments, the elevation or altitude can be determined in a relative sense. For example, if a mobile device has been determined to be at a particular level, e.g., at a ground floor, then a decrease in pressure can be interpreted as a rise in elevation. A differential in pressure sensor reading is obtained between an initial reading, e.g., determined when the user enters the facility and a reading obtained during or immediately after a sudden change in pressure as might be encountered during the device traversing a stairway or elevator. The pressure difference can be converted to a difference in height, without necessarily being referenced to any absolute altitude. The difference in height can be equated to a number of stories, e.g., based on facility information identifying a height of each story. Thus, an estimate can be obtained in a change between floors according to a measured pressure differential. The difference in height can be incorporated in a location of the device and the corresponding track can be updated in a like manner to track movement of the mobile device between different floors of the building 222.

FIG. 2D is a perspective view 240 of the building 222 illustrating an example, non-limiting embodiment of pedestrian tracks obtained according to the communication network of FIG. 1, and the pedestrian tracking system of FIG. 2A in accordance with various aspects described herein. It is understood that by combining pedestrian traffic data gathered from GPS and barometer records for a specific location (building) a 3D model of pedestrian traffic can be established. It is further understood that such 3D pedestrian models are useful in determining whether certain areas of a building are not accessed, e.g., revealing unused space, or revealing "hidden rooms." The perspective view permits visualization of the tracks in a manner that allows tracks to be associated with the different stories of the building. According to the illustrative example, a first group of tracks 244a is associated with a first floor 232a, according to height information of the tracks. Likewise, second and third groups of tracks 244b, 244c are respectively associated with second and third floors 232b, 232c of the building. Visible in the illustrative example, is a particular second-floor feature of the building 226. According to the illustrative example, the pedestrian data is collected over a period of time and reveals an area 226 of the second floor which is rarely accessed. The owners of this floor, through review of this data, may be able to realize a more efficient plan of office space would help them maximize the floor usage, and decide to re-arrange the office layout on the second floor.

According to the illustrative example, none of the groups of tracks 242a, 242b, 242c, generally 242, intersects with or otherwise overlap the second-floor feature. A location of the feature can be evaluated according to a map and/or floor plan of the building 222 to determine whether the second-floor feature can be correlated to a known feature of the building as recorded in the maps/floor plans. To the extent the second-floor feature is not correlated to any known feature, an inference can be drawn characterizing the area as a possible hidden room. Analysis results including any such inferences may prompt further investigation and/or analysis, e.g., by deploying building monitoring assets, such as video cameras to investigate. Alternatively or in addition, further investigation may include a site survey. Alternatively or in addition, pedestrian traffic may be continually monitored in real-time. If during the course of monitoring, it is detected that one or more pedestrians have come within proximity to a secured space 226 on an otherwise unsecured second floor, an alarm may be triggered to the building security who investigate the incident.

Figure 2E:
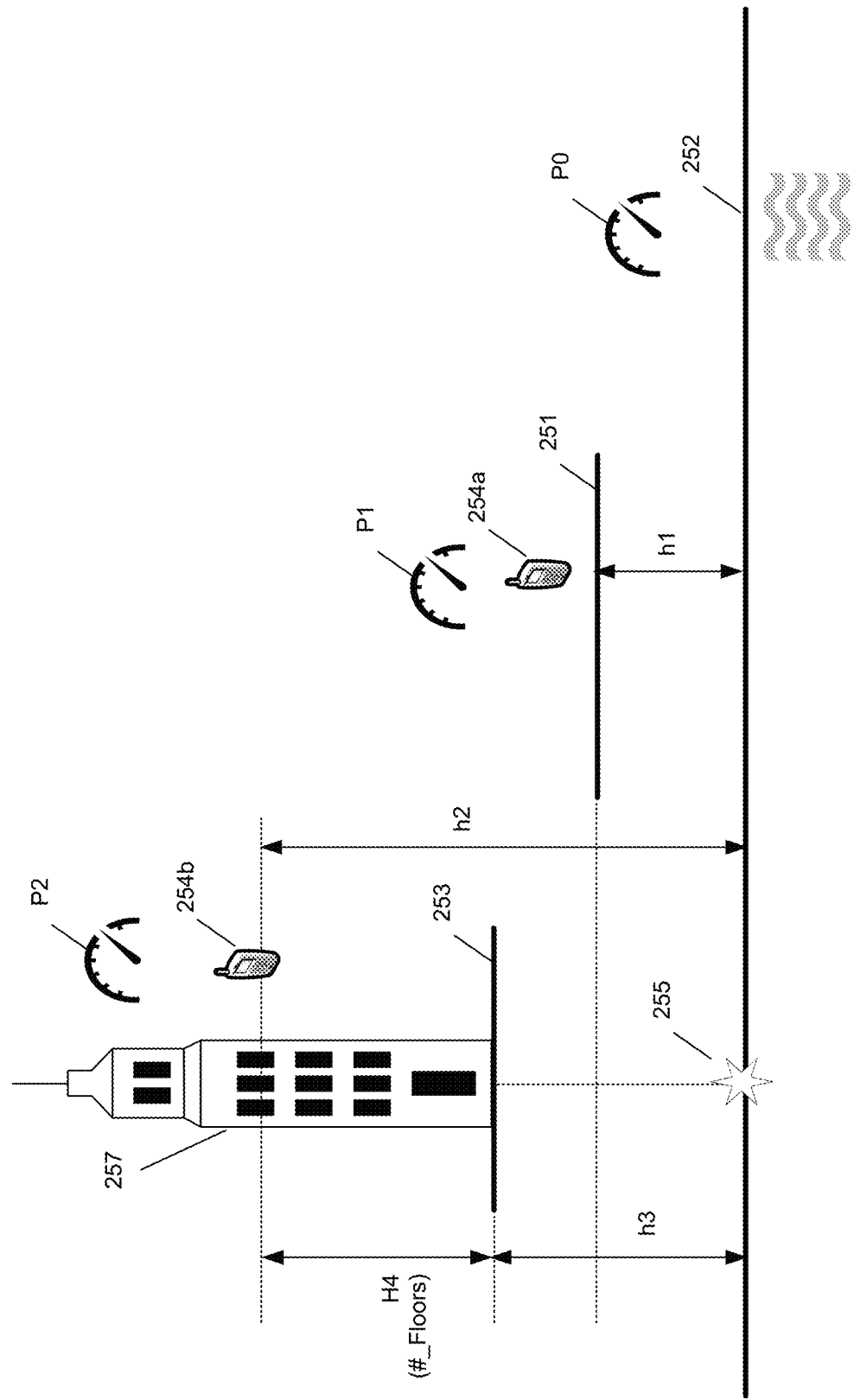
FIG. 2E depicts an illustrative embodiment of a process adapted to obtain an elevation according to barometric pressure readings obtained in accordance with various aspects described herein.

FIG. 2E is a schematic diagram illustrating an example, non-limiting embodiment of a crowd-sourced, barometric pressure determination system 250 functioning within the communication network 100 of FIG. 1, and the crowd-sourced, barometric pressure determination system 200 of FIG. 2A in accordance with various aspects described herein. According to the illustrative example, a first pressure reading, P1, is obtained from a first mobile device 254a, inferred to be operating at a first ground level 251 or some nominal offset to ground level 251, e.g., based on a position of the user and/or the mobile device with reference to the body of the user. In the illustrative example, the first ground level 251 can be determined to be a first elevation or first height, h1, above a common reference height, such as mean sea-level 252. A static atmospheric pressure P0 at mean sea-level can be obtained according to the barometric equation based on known parameters, such as the first pressure reading P1 and the first height h1. Other pressure readings from other mobile devices (not shown) can be similarly obtained at their respective heights and processed in similar manners to obtain other independent estimates of the static atmospheric pressure P0 at mean sea-level. It is understood that some variability in results may be accountable to device dependencies, e.g., in pressure sensor calibration. As disclosed further herein below, in at least some embodiments, such device dependencies can be accounted for by applying a calibration offset to effectively normalize results.

The resulting referenced mean sea-level pressures obtained from the normalized pressure readings of multiple devices can be combined to obtain a combined estimate of the pressure readings at a reference location. For example, the resulting pressures may be averaged or otherwise processed in a statistical manner to obtain a mean, average, standard deviation, variance, and the like. Such statistical results may be used in at least some applications, to further enhance accuracies of ambient conditions at mean sea-level, and/or in determining heights based on the same. In order to account for weather variabilities, a weighted average reference pressure at a reference grid location can be obtained according to pressure readings from multiple devices within a predetermined range of the grid location. Pressure readings obtained from devices closer to the reference grid location being give a greater weight in the averaging that readings obtained from devices further from the reference location.

It is further understood that particular device pressure readings may vary to a greater or lesser extent dependent upon the ambient atmospheric pressure at each device at a time of its pressure readings. According to the weather at the time of the readings, there may be pressure differentials according to device positions. Such differentials are generally more pronounced during windy conditions, wind being an indication of a pressure difference, and less pronounced during calm conditions.

Having obtained an atmospheric pressure P0 at mean sea-level, it is possible to use this result in combination with a pressure reading P2 obtained from a particular mobile device 254b, in order to estimate a height of the particular mobile device 254b above a ground reference 253. A geospatial coordinate reference 255, e.g., a latitude and longitude, or similar horizontal position reference, can be obtained, e.g., from a location receiver of the mobile device 254b. A ground reference height h3 can be obtained from a terrain reference according to the device location. According to the illustrative example, the device 254b is located at an unknown height h4 above ground level 253, the height can correspond to a particular floor of a multi-story building 257. The pressure reading P2 of the mobile device 254 can be used to obtain an elevation h2 above mean sea-level according to the barometric equation and using a static pressure P0 at mean sea-level obtained from a grid of predetermined pressure references obtained from crowd-sourced pressure readings. Having determined the elevation h2 of the mobile device 254b above mean sea-level, a height of the device 254b above ground 253 can be determined as a difference between the device elevation h2 and ground elevation above the same reference, i.e., above mean sea-level. The resulting height h4 above ground level can be converted to floors based on a nominal floor spacing and/or a particular floor spacing as may be known beforehand for the multi-story building 257 or otherwise determinable, e.g., by reference. The floor information can be provided alone or in combination with the x-y reference data to aid in a precise location of a 911 caller and/or first responder personnel.

In an illustrative example, a monitoring application may be adapted to monitor personnel at or within a particular area, such as first responders, e.g., firefighters, police EMTs, and the like, attending to an emergency situation. In at least some embodiments, the monitoring application may be adapted to identify track and/or account for personnel operating within a building, a campus, a park, a neighborhood, etc. The application may determine a list of first responders, e.g., according to their mobile devices adapted to provide information such as a device identifier, a device location, an atmospheric pressure at the device location, and so on. The monitoring application may be adapted to provide one or more of a listing of individuals within an area, counts of individuals, locations, movement and/or lack thereof, entry and/or exit of individuals from the area and so on. By way of further example, the monitoring application may be used to ensure that all individuals have been removed from a building, that all areas have been accounted for, whether certain areas of a building have been visited, e.g., whether a particular floor and/or room has been visited during a sweep operation. The monitored area may include and/or be subdivided to include floors of a multistory building, whereby position information reliably distinguishes between different floors. A reliable determination of a floor level may be crucial in emergency situations in which there is an urgent need to reliably obtain a location of a user of the mobile device 254b, e.g., a 911 caller, and/or first responders operating at the multi-story building 257. Although the illustrative examples include civil applications, it is envisioned that the techniques disclosed herein may be applied similarly in military scenarios, e.g., tracking and/or accounting for troops operating within an area that may include multistory buildings.

In some embodiments, the monitoring application may be adapted to monitor one or more of locations, movement, and motion patterns of persons other than first responders within a monitored area. For example, monitoring may be applied to residents of a residential facility and/or employees of a place of business. Monitoring can include any of the techniques disclosed herein and/or otherwise generally known to those skilled in the art, including determinations of altitude, height and/or floor level according to barometric pressure. Information regarding these individuals, such as their locations, numbers, movements and/or lack thereof may be determined according to the techniques disclosed herein. The monitored information regarding such individuals may be provided to or otherwise shared with first responders. The sharing of such information may occur when first responders have arrived at a scene and/or before they arrive, e.g., for planning of appropriateness of numbers of first responders, types of first responder services and/or equipment that may be appropriate for a particular response.

It is understood that in at least some embodiments, monitoring of locations, movement and/or motion patterns of facility occupants may be conducted in a routine manner, e.g., continuously, and/or periodically, e.g., hourly, daily. The monitored information may be collected in a general manner without necessarily associating any of the monitored information with a particular individual. Alternatively or in addition, the monitoring may be associated with a particular individual. In some embodiments, monitored information may be analyzed to distinguish and/or otherwise characterize individuals and/or groups of individuals. For example, mobility information of disabled persons may differ from non-disabled persons in a manner that allows such disabled persons to be identified as disabled. Consider mobility individuals using a wheelchair as being distinguishable from those not using a wheelchair based on one or more of speed, proximity to features, such as stairwells, and so on, or those who may be convalescing and largely bed ridden. Likewise, an estimate of age, e.g., elderly, or children, may be determined in a similar manner. Such characterizing information may be shared with first responders to support their rescue operations.

By way of example, first responders arrive at a building on fire. The monitoring system alerts the first responders as to anyone in the building that may need extra assistance, or priority, because they cannot evacuate the building as quickly as others, or at all. Information identifying such individuals may be based on historical data, whereas information regarding their location may be provided according to current and/or recent location information. The ability to personalize and/or prioritize a response based on characteristics of individuals provides first responders with another dimension to facilitate their planning and execution of operations. The advantages offered from such a system allows the first responders enter the building and work toward the location of a possibly physically disabled person, who may require extra time and/or assistance for evacuation.

Figure 2F:
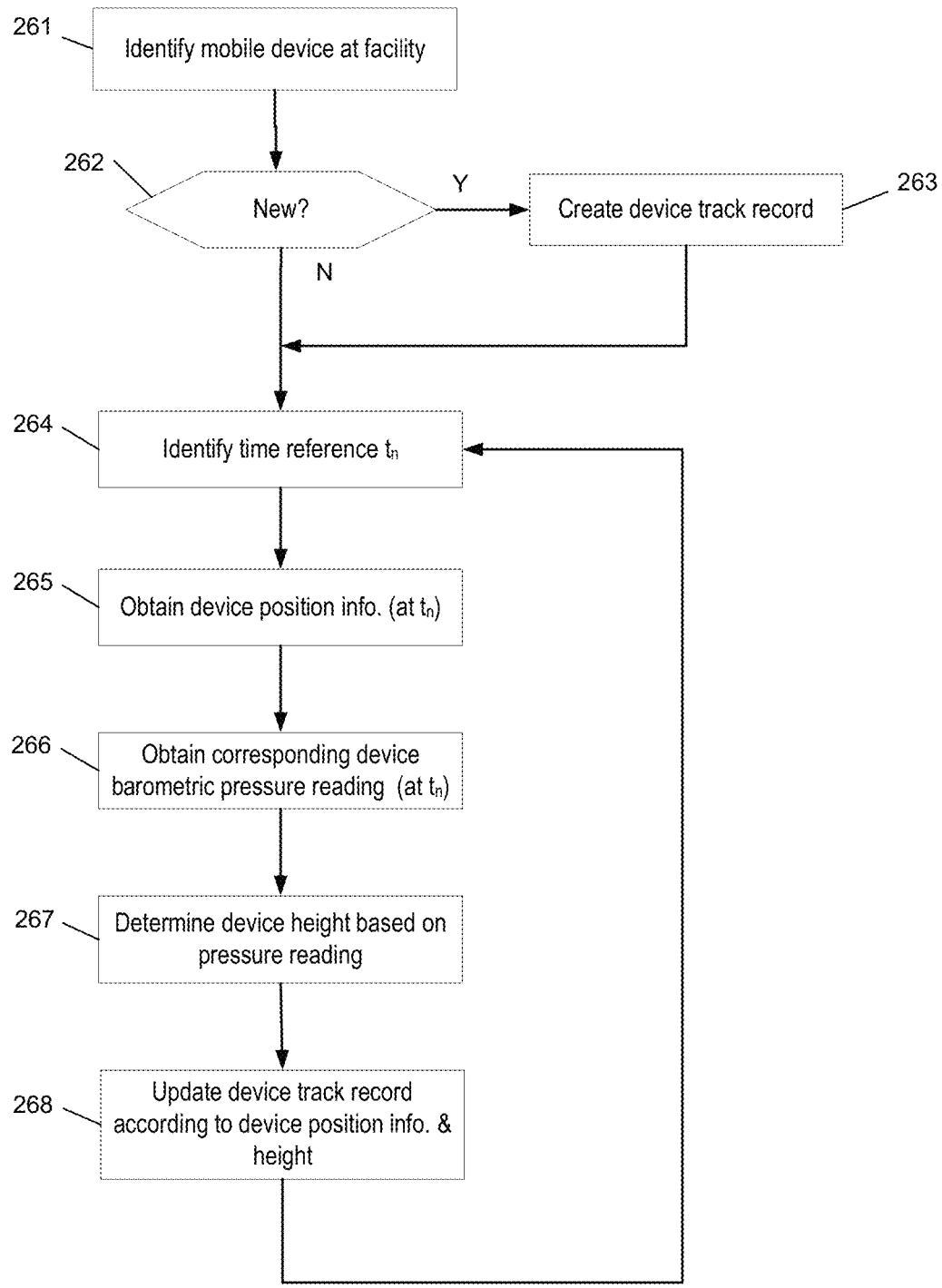
FIG. 2F depicts an illustrative embodiment of a process adapted to determine a pedestrian track according to a barometric pressure reading and in accordance with various aspects described herein.

FIG. 2F depicts an illustrative embodiment of a process 260 adapted to determine positions of moving mobile communication devices according to a barometric pressure reading and in accordance with various aspects described herein. Mobile devices, such as cell phones, tablet devices, smart watches, laptop computers, and more generally, any network enabled device that may be work and/or held by an individual can be identified and monitored as it enters and/or leaves and/or travels within a facility. Although many of the examples refer to personal devices, it is understood that such information may be gathered from any mobile device, including automated devices, e.g., robots, drones, vehicles, and the like, to determine tracks indicative of movement of the devices with reference to a facility. As disclosed elsewhere herein, the monitoring can include collection of location data and collection of corresponding barometric pressure data. The location data generally locates the device on a two-dimensional reference, such as the surface of the earth, e.g., according to geocoordinates and/or according to any other suitable reference system or grid. Location data may include elevation data, e.g., height above some reference, such as mean sea-level, however, in present systems, such as GPS receivers, such height information is less accurate than latitude and longitude information.

A mobile device is identified and/or otherwise located at a facility at 261. Location of the device can be determined by any suitable means, including position data obtained from a communication service provider, e.g., a mobile service provider, a security monitoring service, a facility access control system, self-reporting, device communications of opportunity with wireless access points, and the like. For example, a mobile service provider may monitor and/or otherwise estimate locations of mobile devices in the course of managing resources of the mobile network, e.g., congestion, mobility, handovers, and so on. It is understood that such monitoring may be according to an accuracy that approximates a location of a mobile device suitable for managing communication assets, but not necessarily suitable for tracking mobility within a particular facility to an accuracy suitable to discern proximity to certain features, e.g., buildings, floors, rooms, stairwells, corridors, and so on. However, the mobile service provider may provide a notification when a mobile device is within an approximate region of a facility.

Other examples may include a facility access, such as a card reader or keypad entry, that obtains information indicative of an individual entering the facility. Likewise, a security or surveillance system may provide indications that something is present and/or moving within a monitored area of the facility. Such information may be used to prompt an investigation to determine an identity of any associated mobile devices. For example, if a card reader obtains descriptive information from an activation, that information may identify a user and/or user account. Responsive to identification of the individual, other records may be accessed to identify mobile communication devices associated with the user. For example, an IMEI of an individual's mobile phone may be associated with other indicia, such as an employee ID, or name obtained via the card reader.

Alternatively or in addition, activation of an access control system and/or security monitoring system, may prompt a consultation of communication services, e.g., a mobile operator, and/or wireless access points operating within the facility. The consultation may provide other indicia, such as equipment identifiers, e.g., IMEI, active in the general vicinity. In at least some embodiments, activation of an access control system and/or security monitoring system may prompt an interrogation process whereby one or more interrogation signals are directed towards any mobile communication devices operating within a vicinity of the activation. The interrogation signals may be adapted to obtain equipment identifiers, e.g., IMEI. Alternatively or in addition, device identification information may be obtained via communications of opportunity between the mobile device and a mobile operator and/or a wireless access point.

The example process 260 includes determining whether the device is newly present to the facility at 262. Any identifying information obtained from the mobile device may be evaluated to determine whether the particular device corresponds to a previously identified device, or whether the device may be newly operating within the facility. For example, any identifying information associated with the device, such as an IMEI and/or an identified individual associated with the device, can be maintained in a stored record, including position information of the mobile device and/or the individual. Such records may contain time reference information, such as times associated with monitored communications, times associated with location data, times associated with pressure sensor readings, position determinations, and the like.

In at least some embodiments, an entrance and/or presence of a new device within a predetermined area may be used to monitor security. For example, if a new device enters a monitored area at a particular time, and/or is present within a monitored area within a particular time period, such information may prove relevant to forensic analysis of crime investigations, e.g., theft of property. For multistory buildings, such as office buildings, apartment buildings, hospitals and the like, an ability to determine which floor the device is on may be highly relevant to such applications. Alternatively or in addition, a determination of a new appearance of a device within an monitored area, such as a particular room or suite of a particular floor may trigger a proactive measure, such as an activation of another system or systems, e.g., an external security monitor, locks, cameras, and the like.

If a particular device and/or user is identified as operating within the facility, the identity of the device and/or user can be compared to the stored records to determine whether records exist for the identified device and/or user. To the extent a record exits, it can be determined at 262 that the user and/or device is not new. It is understood that any evaluation of a device being new to a facility may be determined according to a time window. For example, new may imply a first ever detection of the individual and/or device at the device. Alternatively or in addition, new may imply detection within a reporting period, such as a calendar day or days, or a time window, e.g., after some reference hour and/or within some monitored period of time, e.g., according to daylight, hours of operation, employee shifts, and so on. In at least some embodiments, such analysis periods may be entered via a user interface beforehand and/or subsequently, e.g., during analysis at a later date.

To the extent it is determined that the device is newly present at the facility, a corresponding record may be generated. For example, a record including one or more of an identity of the device, of an individual associated with the device, a time associated with a determination that the device newly entered the facility, a location of the device, a pressure reading, a position determined according to the location and/or the pressure reading, and the like. In at least some embodiments, a device track record is initiated at 263. The track record may include any of the aforementioned details. In particular, the track record may include position information suitable to identify a position of the device within the facility to a desired specificity. Example specificities include, without limitation, a measure of feet and/or inches, a floor level, a width of a corridor, and so on.

To the extent it is determined that the device is not newly present at the facility, and subsequent to creation of a device track record at 263, the process 260 continues by identifying a time reference $t_n$ at 264. The time reference may be obtained, without limitation, from monitored communications, from the mobile device itself, from a third party, such as a mobile service provider and/or security monitoring service. The time reference may include one or more of an indication an approximate time of a communication, an approximate time of a GPS location determination, an approximate time of a barometric pressure reading, and/or a time at which a determination of a position of the device was established.

The time references may be referenced to a time of day, e.g., to allow for filtering and/or analysis of device records. Alternatively or in addition, the time reference may be relative, e.g., in reference to a marked time. The time reference may be used to order a sequence of device positions according to relative positions of the device. The time reference may be determined individually according to the device, e.g., initiated upon identification of the mobile device within the facility. In this manner, each device may include a respective time reference sufficient to permit an ordering of the device's position data in a sensible sequence indicative of its motion within the facility. Some relative time records may include a simple order at which the measurement was obtained, without necessarily identifying any time difference between measurements. Alternatively or in addition, relative time records may be measured according to minutes, seconds and/or fractions thereof to permit estimations of speed or velocity associated with mobility of the device.

Position information associated with the device is obtained at 265. This may include any of the example techniques for determining position disclosed herein or otherwise generally known to those skilled in the art, such as a position obtained from a location receiver, e.g., a GPS receiver, of the mobile device. In at least some embodiments, the position information is associated with a time reference, e.g., an approximate time at which the position data was obtained.

A corresponding barometric pressure reading at a location of the device is obtained at 266. This may include any of the example techniques for determining barometric pressure disclosed herein or otherwise generally known to those skilled in the art, such as a position obtained from an onboard barometric pressure sensor of the mobile device. In at least some embodiments, the barometric pressure reading is associated with a time reference, e.g., an approximate time at which the pressure reading was obtained.

A height of the device based on pressure reading is determined at 267. This may include any of the example techniques for determining a height of the device based on the barometric pressure disclosed herein or otherwise generally known to those skilled in the art. This may include referencing the barometric pressure reading to a standard reference height, such as mean sea-level, to facilitate a comparison to a corresponding ambient atmospheric pressure. Such reference pressure readings may be obtained from reference pressure sensing devices at known locations and adequately proximate to the facility to permit comparison in view of natural weather variations. In at least some embodiments, the barometric pressure reading is associated with a time reference, e.g., an approximate time at which the pressure reading was obtained.

In at least some embodiments, a reference pressure reading is obtained form the mobile device itself. The reference pressure reading may be associated with a particular location within the facility at which the pressure reading was obtained. For example, if a pressure reading was obtained when a device was proximate to an access monitoring device, a doorway, a security monitoring camera, or the like, the approximate location of the device can be referenced to an associated known location and/or height within the facility. If an initial reading was obtained at a first floor, that may set a baseline for a particular identified device and/or other identified within the facility. The pressure reading may be evaluated in reference to the known height in order to establish a baseline to which other pressure measurements may be compared. Such comparisons may be made to subsequent pressure readings and/or to previous pressure readings. Such comparisons may be evaluated further to determine a relative height offset or differential that may be recorded with the position data and used to establish tracks, traces and/or plots of movement of the device within the facility.

It is understood that relatively sudden changes in pressure readings may result from movement of a pressure reading device to different elevations as may be encountered during transit in an elevator and/or via stairs. It is further understood that such relatively sudden changes in pressure may result from other processes, such as an opening and/or closing of a window, a door, or other entrance and/or exit to a building and so on. In at least some embodiments, a determination is made between movement of the device and another process that may account for a sudden pressure change. For example, if a sudden pressure change is observed, a position of the device can be obtained and compared to a facility map. The comparison may reveal whether the device is proximate to an elevator and/or stairwell. If so, then the sudden change of pressure may be attributed to a change in altitude, in which instance the pressure change may be correlated to an updated position of the device to a different floor. The updated floor position may be determined according to a known floor and a magnitude of the atmospheric pressure change. However, if a location of the device does not correspond to an elevator and/or stairs, then an inference may be drawn that the pressure change resulted from another process.

It is understood that buildings may maintain an internal pressure that differs from an ambient outside pressure, e.g., due to heating, ventilation and/or air-conditioning (HVAC) processes. Thus, a relatively sudden drop in pressure without a location of the pressure reading device indicating that it is proximate to a means to change floors would suggest that the room has been exposed to a different environment, such as a different wing of the same building, a different HVAC zone, and/or an outside pressure. It is appreciated that detection of pressure changes and attribution of such changes to exposure of one environment to another may be used for security monitoring. For example, a determination that a window and/or door were opened according to pressure readings may be used to trigger an alarm and/or actuate other systems, such as cameras, locks, and so on.

A stored record of the device information, e.g., a device track record, can be updated according to current position information and/or height information at 268. For example, the device track record may include data points referred to as "breadcrumbs" providing a sequence of positions obtained at different times as the mobile device moved about the facility.

It is understood that reporting of position and/or pressure sensor readings from a mobile device will bear on resources of the mobile device, such as bandwidth, power and/or processing capacity. Accordingly, the techniques disclosed herein may be adapted to operate in an efficient manner. For example, position data may be obtained from communications of opportunity. Alternatively or in addition, self reporting and/or interrogation may be conducted for devices determined to be in motion. Should a device be determined to be stationary, position updates may not be required, e.g., the position inferred form a previous position and lack of mobility. Mobility may be detected by sensors of the device, e.g., the position receiver determining movement beyond a threshold distance, accelerometers, external monitoring systems, and the like.

Figure 2G:
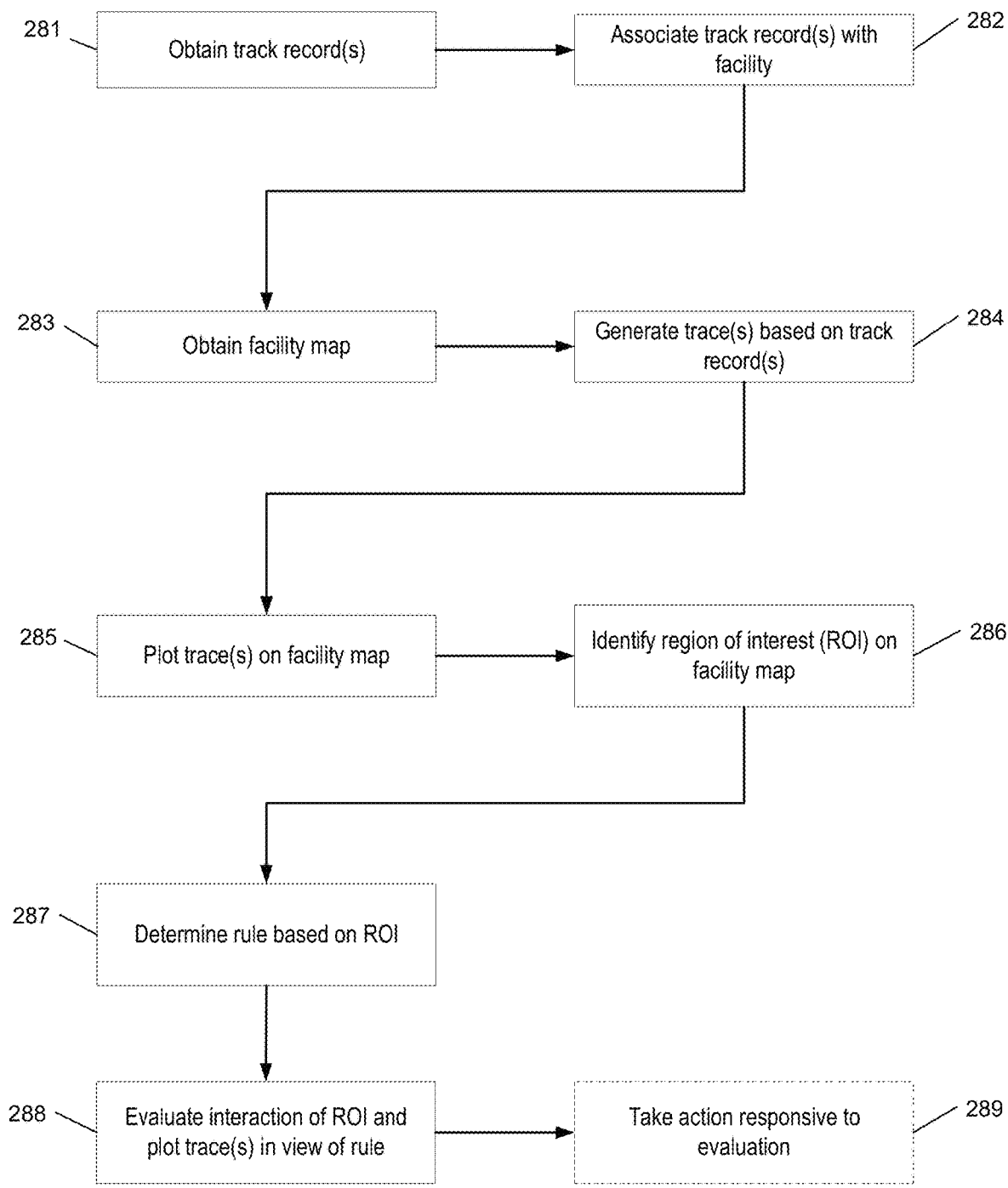
FIG. 2G depicts an illustrative embodiment of a process adapted to evaluate a facility according pedestrian tracks and in accordance with various aspects described herein.

FIG. 2G depicts an illustrative embodiment of a process 280 adapted to evaluate a facility according pedestrian tracks and in accordance with various aspects described herein. According to the example process, one or more track records are obtained at 281. In at least some embodiments, the track records are obtained according to the aforementioned tracking process 260 (FIG. 2F). Alternatively or in addition, the track records may be obtained from previously recorded tracks, e.g., available via a storage system or database. The track records may be associated with a particular device and/or with a group of devices.

The track records are associated with a facility at 282. For example, the track records obtained according to the aforementioned tracking process 260, may be evaluated to determine that positions are proximate to a facility. Such proximity may be determined according to GPS location and/or any of the other position monitoring system, including, without limitation, access control systems, security systems, and the like. In some embodiments the stored records may include a facility designator storing an association of the mobile device, its recorded position, and an identified facility. Alternatively or in addition, an association of a device track with a facility can be determined at a later time, e.g., during an evaluation of device tracks according to position data alone. Position data can be compared to a known or estimated location of the facility to determine an association when the location of the device places the device proximate to the facility. It is understood that such comparisons may be based on GPS locations, or any other horizontal reference grid locations, and/or height references. For example, a facility may represent one or more floors within a multi-story building. The floors may be contiguous in height, or not.

In at least some embodiments, a facility map is obtained at 283. The facility map may include a street map, a satellite image, a topological map, architectural style building plans, building sketches, and so on. Such building plans may include floor plans for one or more floors of a multi-story building, elevation plans within a floor and/or among multiple floors, and so on. Plots or traces of movement of the device can be generated at 284 based on track records. For example, traces may be graphically represented on a graphical representation of a facility map, floor plan, elevation plan, and so on, at 285.

In at least some embodiments, a region of interest (ROI) is identified in reference to the facility at 286. For example, the ROI may be associated with the facility map, floor plan elevation plan, and the like. The associations may be represented graphically according to the facility map, floor plan, elevation plane, and interaction of the plot trace(s) and the ROI in view of rule may be evaluated at 288.

A rule may be determined according to the ROI at 287. For example, the rule may be directed toward security concerns. For example, a rule may identify when any device is proximate to the ROI. Such proximity can be determined from the association of the device track and the ROI in reference to the facility map, floor plan, elevation plan. The rule may provide notification to a security monitoring service of activity proximate to the ROI. In at least some embodiments, action may be taken at 289 responsive to evaluation of any interaction obtained at 288. For example, additional security measures may be taken to monitor and/or prevent access to the ROI, by activating locks, activating security sensors, dispatching security staff, and the like.

By way of an illustrative example, a user gains access to a secured location by swiping his or her access badge. The user's information is stored in a repository, including information about the IMEI of the cellular device assigned to that user. If the IME assigned to the user is not detected, and/or a different IMEI is detected within an interior of the secure building and/or secure room space after the user has gained access using their access badge, special security measures may be taken. For example, an alert may be transmitted to a security monitoring service. In this manner, the user's cellular device IMEI is used to validate that the person who gained access, i.e., coded in, by swiping their badge, is the person actually in that space.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and processes 260 presented in FIGS. 1, 2A, 2F and 3. For example, virtualized communication network 300 can facilitate in whole or in part determination of a reference atmospheric pressure grid at a reference elevation, e.g., mean sea-level, based on crowd-sourced pressure readings from mobile devices of opportunity. In at least some embodiments, the virtualized communication network 300 can further facilitate in whole or in part determination of a location of a mobile device, including a floor location in a multi-story structure, based on a device reported location and pressure reading, in reference to the crowd-sourced pressure readings.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs);

reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In some embodiments, such as the example system 300, a mobile device tracking application 382 is in communication with one or more mobile devices 384a, 384b, . . . 384n, generally 384 and/or one or more static devices, 386a . . . 386m, generally 386. The mobile device tracking application 382 can be adapted to facilitate in whole or in part determination of a position of a mobile device based on input from a location receiver of the mobile device 384 and an atmospheric pressure reading from a barometric pressure sensor of the mobile device 384. Atmospheric pressure at a reference elevation, e.g., according to mean sea-level, can be determined according to an atmospheric pressure reading from a barometric pressure sensor of the static device 386 at a known height above the reference elevation. Alternatively, or in addition, the atmospheric pressure at the reference elevation can be determined according to crowd-sourced pressure readings from mobile devices 384 of opportunity.

In some scenarios it is anticipated that more than one of the mobile devices 384 and/or other pressure sensing devices as may be deployed and/or accessed, may indicate a relatively sudden change in atmospheric pressure. It is appreciated that such widespread pressure changes may be attributable to a weather event, such as a passing of a weather front, an impending storm, and the like. In some embodiments, a pressure monitoring system is adapted to detect a relatively sudden pressure change. When such a change is detected, e.g., according to a threshold, the monitoring system can be adapted to determine whether other pressure reporting devices within the same general area have also reported changes. In at least some embodiments, an inference of a weather event can be drawn according to a correlation of relatively sudden pressure changes among multiple devices operating within a common area, e.g., within a cell and/or group of cells of a mobile cellular network, within a predetermined map area, such as a neighborhood, town or city, and/or within a predetermined range of one or more of the other pressure reporting devices. Atmospheric pressure changes attributed to a weather event may be shared with one or more other devices and/or a pressure monitoring system, e.g., to adjust a pressure baseline, and the like, to improve system accuracy.

Likewise, in at least some embodiments, such as the example system 300, a location server, illustrated as a height finder service 380 is in communication with one or more mobile devices 384 and/or static devices, e.g., 386, THE mobile device tracking application 382, and/or other components of the communication network virtualized network function, e.g., one or more of the virtual network elements 330, 332, 334. The height finder service 380 can be adapted to facilitate in whole or in part determination of a height of a mobile device 384, including its floor location in a multi-story structure, based on a device reported location and pressure reading, in reference to the reference atmospheric pressure.

In at least some embodiments, the mobile devices 384 include location determining functionality, e.g., in the form of any one of an operating system, a client, a resident app, and combinations thereof. The resident functionality can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on.

In at least some embodiments, one or more of the device tracking app 382, the height finder service 380, or one or more of the virtual network elements 330, 332, 334 can be adapted to obtain facility information and to process the information in combination with the mobile device position information to obtain processed results. For example, the processed results may include graphical depictions of the facility, or at least a portion of the facility, in combination with cumulative position data of one or more of the mobile devices 384. The device tracking app 382 may contain post processing and/or analysis features to enable filtering of position data, e.g., according to device identifiers, locations, time windows, events, such as location dependent triggers, and the like.

Figure 4:
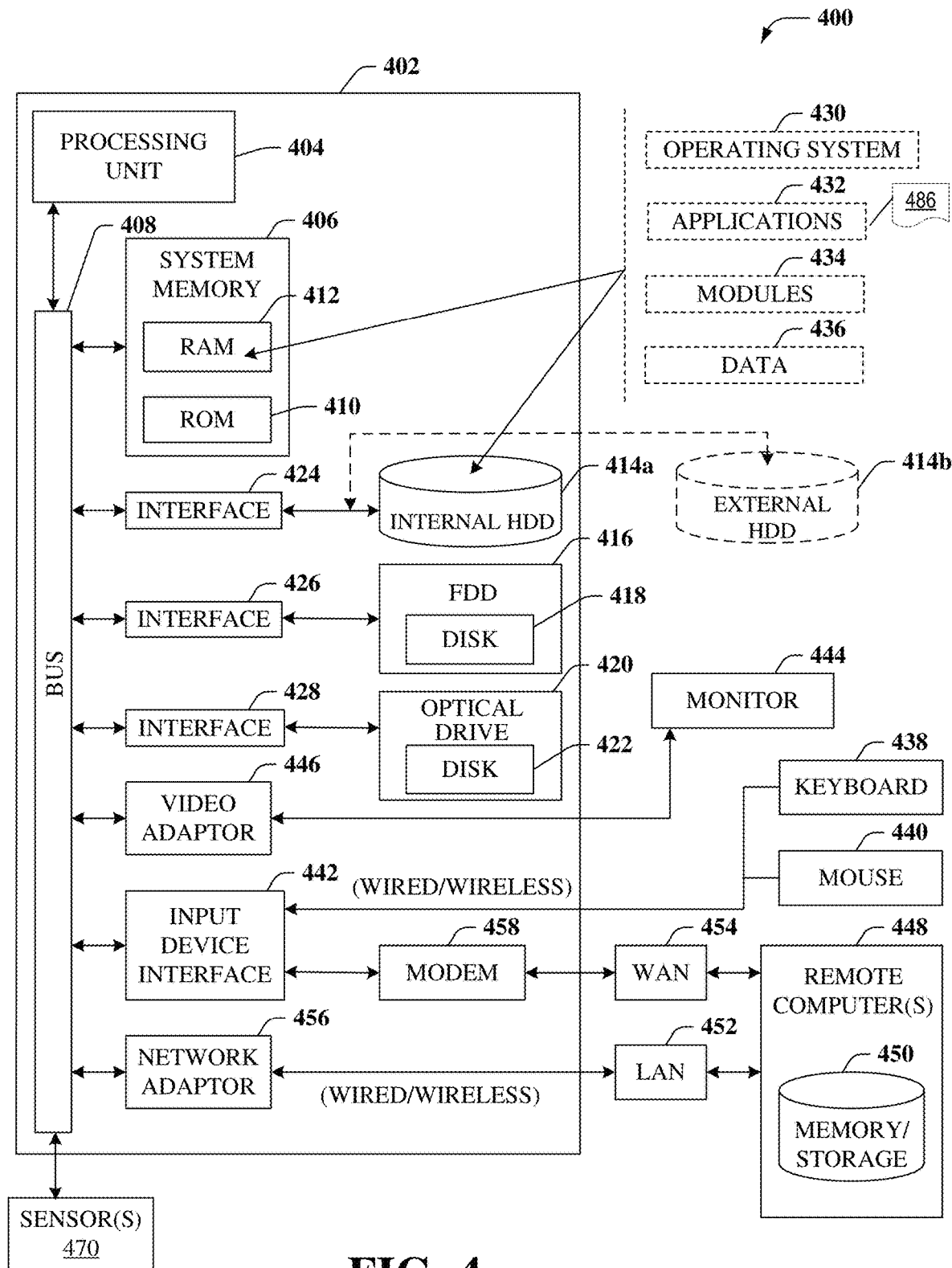
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part determination of a reference atmospheric pressure grid at a reference elevation, e.g., mean sea-level, based on crowd-sourced pressure readings from mobile devices of opportunity. In at least some embodiments, the computing environment 400 can further facilitate in whole or in part determination of a location of a mobile device, including a floor location in a multi-story structure, based on a device reported location and pressure reading, in reference to the crowd-sourced pressure readings.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414a can also be configured for external use, as an external HDD 414b (shown in phantom) in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT and/or 100BaseT wired Ethernet networks used in many offices.

When used in a mobile device tracking and/or track analysis scenario, the computer 402 can include one or more pressure sensors 470 adapted to measure atmospheric pressure proximate to the one or more pressure sensors 470. Alternatively or in addition, one or more of the applications 432 can be adapted to include functionality 486 directed to determination of a reference atmospheric pressure at a reference elevation, e.g., mean sea-level, and determining cumulative positions, tracks and/or traces of movement of one or more mobile devices within a facility, such as a building, campus, geographic region, and the like. Alternatively or in addition the functionality 486 can be adapted to facilitate in whole or in part determination of a position including height of a mobile device, including its floor location in a multi-story structure, based on a device reported location and pressure reading, in reference to the pressure readings. The location information, including the height information can be processed according to sequences of positions determined at different times over an extended time period. The processing can include, without limitation, identification of hidden rooms or spaces 215 (FIG. 2A) as areas devoid of tracks. Other applications can include, without limitation, identification of devices proximal to a particular feature of a facility, such as a secure room or area. Depending upon an identity of the user, or lack thereof, the processing may generate triggers and/or alarms to draw attention to unauthorized and/or suspicious devices approaching and/or intersecting secure rooms.

Figure 5:
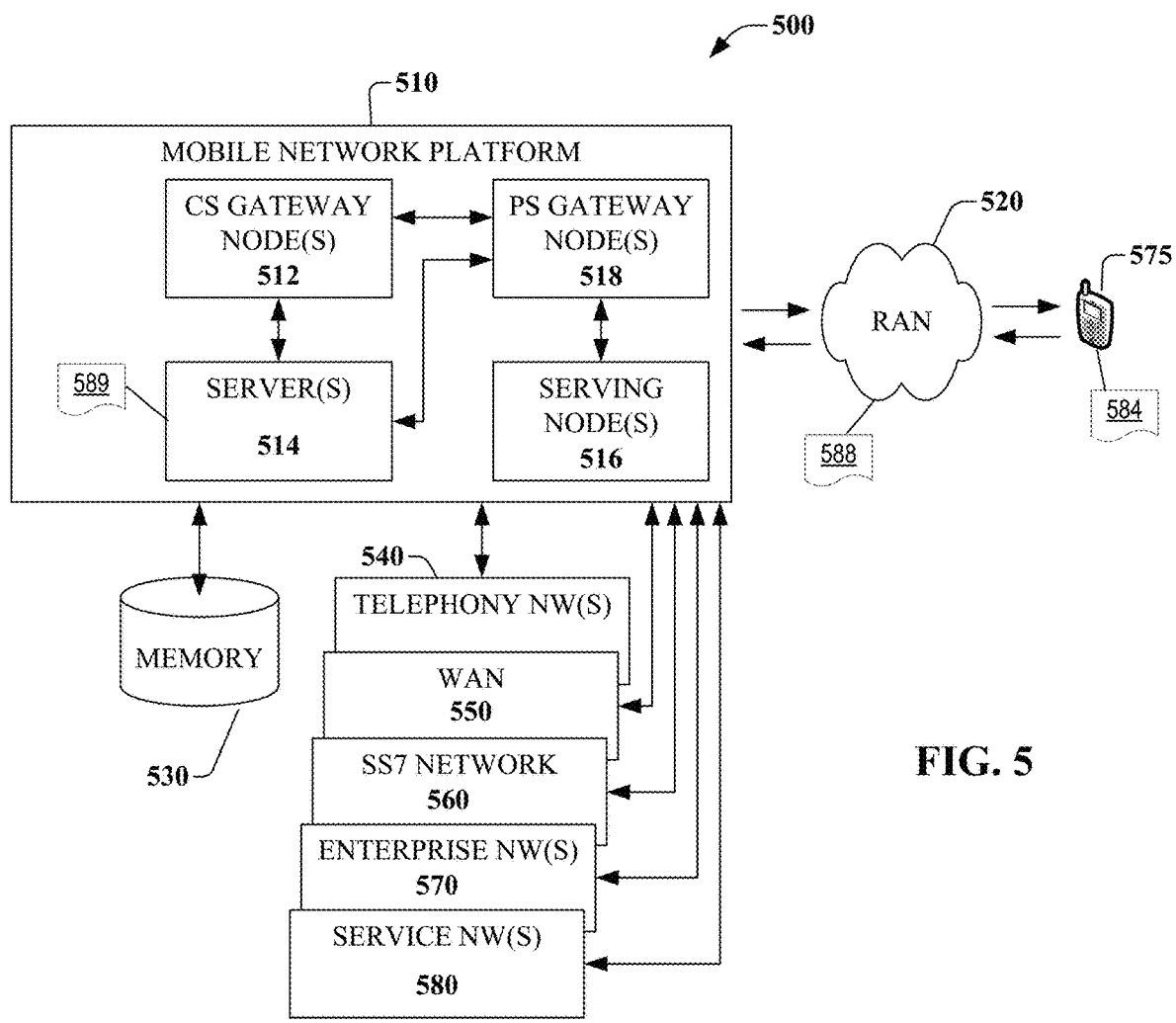
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, embodiment 500 of the mobile network platform 510 can facilitate in whole or in part determination of a reference atmospheric pressure grid at a reference elevation, e.g., mean sea-level, based on crowd-sourced pressure readings from mobile devices of opportunity. In at least some embodiments, the computing environment 400 can further facilitate in whole or in part determination of a location of a mobile device, including a floor location in a multi-story structure, based on a device reported location and pressure reading, in reference to the crowd-sourced pressure readings. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

When used in a used in a mobile device tracking and/or track analysis scenario, the embodiment 500 of the mobile network platform 510 can include one or more of functionality 589 at the server(s) 514, functionality 588 operational within the RAN 520 and/or functionality 584 operational within the mobile device 575. One or more of the disclosed functionalities 584, 588, 589 can be adapted to measure atmospheric pressure proximate to the one or more pressure sensors. Alternatively or in addition, one or more of the disclosed functionalities 584, 588, 589 can be adapted to directed to determination of a reference atmospheric pressure at a reference elevation, e.g., mean sea-level, and determining cumulative positions, tracks and/or traces of movement of one or more mobile devices within a facility, such as a building, campus, geographic region, and the like. Alternatively or in addition the disclosed functionalities 584, 588, 589 can be adapted to facilitate in whole or in part determination of a position including height of a mobile device, including its floor location in a multi-story structure, based on a device reported location and pressure reading, in reference to the pressure readings. The location information, including the height information can be processed according to sequences of positions determined at different times over an extended time period. The processing can include, without limitation, identification of hidden rooms or spaces as areas devoid of tracks. Other applications can include, without limitation, identification of devices proximal to a particular feature of a facility, such as a secure room or area. Depending upon an identity of the user, or lack thereof, the processing may generate triggers and/or alarms to draw attention to unauthorized and/or suspicious devices approaching and/or intersecting secure rooms.

Figure 6:
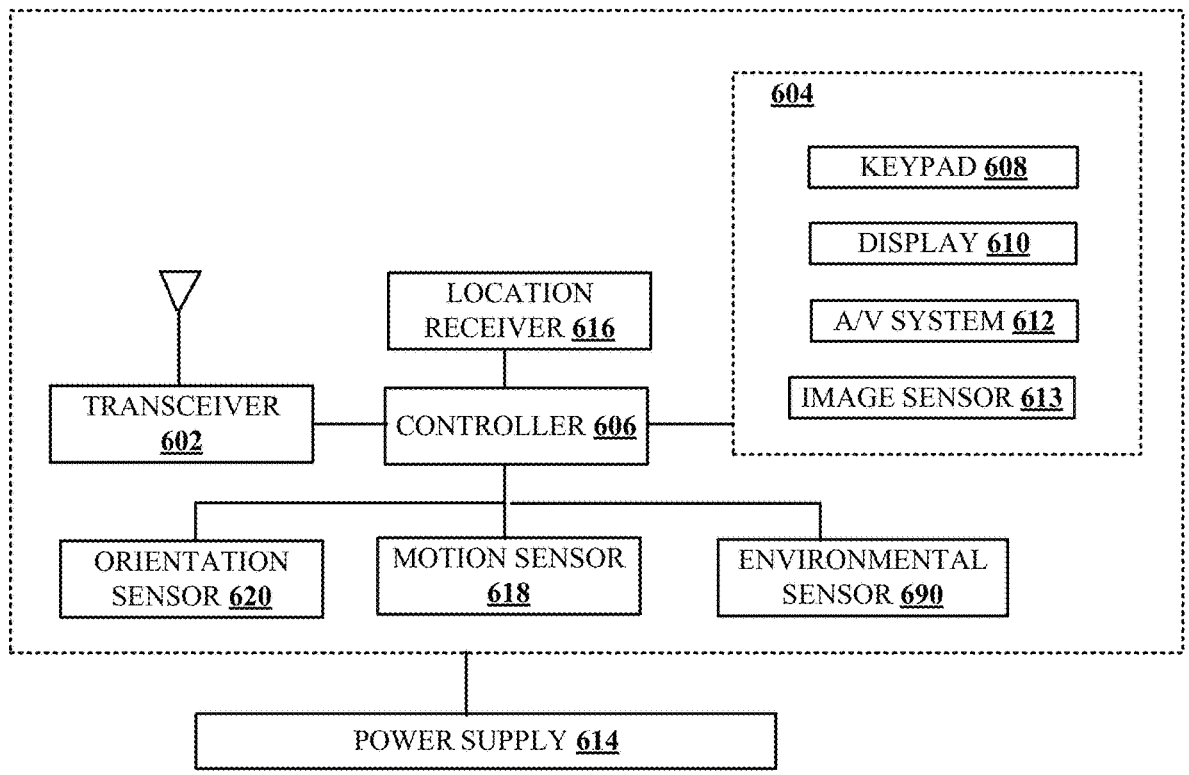
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determination of a reference atmospheric pressure grid at a reference elevation, e.g., mean sea-level, based on crowd-sourced pressure readings from mobile devices of opportunity. In at least some embodiments, the computing device 600 can further facilitate in whole or in part determination of a location of a mobile device, including a floor location in a multi-story structure, based on a device reported location and pressure reading, in reference to the crowd-sourced pressure readings.

The communication device 600 can comprise a wireline and/or wireless transceiver 602 (herein transceiver 602), a user interface (UI) 604, a power supply 614, a location receiver 616, a motion sensor 618, an orientation sensor 620, an environmental sensor, such as a barometric pressure sensor 690 and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

It some embodiments, altimeter readings and location, e.g., GPS, readings are obtained from a smart device, such that the altimeter readings facilitate a more accurate detection of height, e.g., floor, to locate the smart device in 3D space. The readings and/or positions determined from such readings, together with subsequent readings and/or positions may be associated into a mapping of pedestrian traffic, e.g., at a company's floor. In some embodiments, detection of a private smartphone device within a particular facility, or controlled region of the facility, may trigger an alert to a company's alarm system. Understanding that such alerts for authorized employees might prove problematic, the company may permit and/or require its employees to install a special app, e.g., to identify the device as a permitted private device, such that any potential privacy issues may be abated.

It is envisioned that the various techniques disclosed herein can be applied to solve problems associated with one person having and using another person's key, access card or access keypad combination (assuming the person always carries their smartphone). Other applications can include, without limitation, tracking foot traffic in shopping areas, e.g., malls, store fronts, determining when and/or where new sidewalks need to be constructed, provide a general assessment of foot traffic patterns within a structure, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
   a processing system including a processor; and
   a memory that stores executable instructions that, when executed by the processing system, facilitate performance of operations, the operations comprising:
      determining a mobile device is within a boundary of a facility;
      determining, responsive to the mobile device being within the boundary of the facility, a current location of a mobile device according to a horizontal reference plane;
      obtaining a corresponding ambient barometric pressure reading at the current location of the mobile device, wherein the corresponding ambient barometric pressure reading is obtained coincidentally with the determining of the current location;
      determining a current three-dimensional (3D) position of the mobile device according to the current location and the corresponding ambient barometric pressure reading;
      combining the current 3D position of the mobile device with other 3D positions of the mobile device determined at other times to obtain a historical record of positions of the mobile device;
      combining the historical record of positions of the mobile device with a map of the facility to obtain a pattern of movement of the mobile device within the facility;
      combining the pattern of movement of the mobile device within the facility with patterns of movement of other mobile devices within the facility to obtain a cumulative record of movement of a plurality of mobile devices within the facility, the plurality of mobile devices comprising the mobile device and the other mobile devices;
      determining a subspace of the facility lacks any cumulative record of movement of a plurality of mobile devices within the facility;
   comparing the subspace to a map of the facility; and
      identifying a hidden room responsive to the map of the facility lacking a defined feature corresponding to the subspace.

2. The system of claim 1, wherein the determining of the current location of the mobile device according to the horizontal reference plane comprises obtaining geolocation coordinates corresponding to the current location of the mobile device.

3. The system of claim 2, wherein the corresponding ambient barometric pressure reading is obtained via a pressure sensor of the mobile device, and wherein the geolocation coordinates are obtained via a GPS receiver of the mobile device.

4. The system of claim 1, wherein the determining of the current 3D position of the mobile device further comprises:
   comparing the corresponding ambient barometric pressure reading to a reference barometric pressure reading to obtain a barometric pressure differential; and
   determining a height reference according to the barometric pressure differential, wherein the current 3D position is based on the current location of the mobile device according to the horizontal reference plane and the height reference.

5. The system of claim 4, wherein the determining the height reference according to the barometric pressure differential further comprises:
   obtaining the reference barometric pressure reading from an independent pressure sensor at a known height above mean sea-level;
   converting the reference barometric pressure reading to an equivalent mean sea-level atmospheric pressure according to the known height above mean sea-level;
   determining a corresponding height of the mobile device above mean sea-level according to the corresponding ambient barometric pressure reading and the equivalent mean sea-level atmospheric pressure;
   estimating a ground height at the current location of the mobile device to obtain an estimated ground height; and
   determining a difference between the corresponding height of the mobile device above mean sea-level and the estimated ground height to obtain a corresponding height of the mobile device above ground.

6. The system of claim 1, wherein the determining a subspace of the facility lacks any cumulative record of movement of a plurality of mobile devices within the facility comprises:
   generating a graphical representation of the facility;
   generating a graphical representation of the cumulative record of movement of the plurality of mobile devices within the facility to obtain a plurality of tracks; and
   combining the graphical representation of the facility and the graphical representation of the cumulative record of movement of the plurality of mobile devices within the facility to obtain a combined graphical representation.

7. The system of claim 6, wherein the determining the subspace of the facility lacks any cumulative record of movement of a plurality of mobile devices within the facility further comprise:
   determining the subspace of the facility lacks any intersection with the graphical representation of the cumulative record of movement of the plurality of mobile devices within the facility;
   comparing the subspace to the map of the facility; and
   identifying the hidden room responsive to the map of the facility lacking a defined feature corresponding to the subspace.

8. The system of claim 1, wherein the operations further comprise:
   determining an identity of the mobile device, wherein the mobile device is distinguishable from the other mobile devices of a plurality of mobile devices within the facility according to the identity;
   requesting the mobile device to forward the current location of the mobile device and the corresponding ambient barometric pressure reading; and
   storing the historical record of positions of the mobile device.

9. The system of claim 8, wherein individual tracks of a plurality of tracks of the mobile devices within the facility are distinguishable according to identities of the plurality of mobile devices.

10. The system of claim 9, wherein the operations further comprise:
    detecting a request for authorization, wherein authorization permits access to a subspace of the facility;
    associating the mobile device with the request for authorization; and
    evaluating the request for authorization according to the identity of the mobile device to obtain an evaluation result, wherein authorization is granted or denied responsive to the evaluation result.

11. The system of claim 10, wherein the operations further comprise:
identifying an identity of an authorized mobile device according to the request for authorization;
comparing the identity of the mobile device to the identity of an authorized mobile device to obtain a comparison; and
initiating an alarm signal responsive to the comparison indicating a mismatch.

12. The system of claim 1, wherein the determining of the current 3D position of the mobile device is repeated periodically.

13. A method, comprising:
determining, by a processing system including a processor, a current location of a mobile device according to a horizontal reference;
obtaining, by the processing system, a corresponding barometric pressure reading at the current location of the mobile device;
determining, by the processing system, a current position of the mobile device according to the current location of the mobile device and the corresponding barometric pressure reading;
updating, by the processing system, a historical record of positions of the mobile device according to the current position of the mobile device and other positions of the mobile device determined at other times;
referencing, by the processing system, the historical record of positions of the mobile device to a map of a facility to obtain a referenced pattern of movement of the mobile device within the facility;
combining, by the processing system, the referenced pattern of movement of the mobile device within the facility with referenced patterns of movement of other mobile devices within the facility to obtain a cumulative record of movement of a plurality of mobile devices within the facility, the plurality of mobile devices comprising the mobile device and the other mobile devices;
determining, by the processing system, a subspace of the facility lacks any cumulative record of movement of a plurality of mobile devices within the facility;
comparing, by the processing system, the subspace to the map of the facility; and
identifying, by the processing system, a hidden room responsive to the map of the facility lacking a defined feature corresponding to the subspace.

14. The method of claim 13, wherein the determining of the current position of the mobile device further comprises:
comparing, by the processing system, the corresponding barometric pressure reading to a reference barometric pressure reading to obtain a barometric pressure difference; and
determining, by the processing system, a height value according to the barometric pressure difference, wherein the current position based on the current location of the mobile device according to the horizontal reference and the height value.

15. The method of claim 14, further comprising:
combining, by the processing system, the referenced pattern of movement of the mobile device within the facility with the referenced patterns of movement of other mobile devices within the facility to obtain a cumulative record of movement of a plurality of mobile devices within the facility, the plurality of mobile devices comprising the mobile device and the other mobile devices.

16. The method of claim 15, further comprising:
generating, by the processing system, a graphical representation of the facility;
generating, by the processing system, a plot of a cumulative record of movement of the plurality of mobile devices within the facility; and
combining, by the processing system, the graphical representation of the facility and the plot of the cumulative record of movement of the plurality of mobile devices within the facility to obtain a combined graphical representation, wherein a plurality of tracks of the plurality of mobile devices relative to a feature of the facility is depicted in the combined graphical representation.

17. The method of claim 13, further comprising:
determining, by the processing system, an identity of the mobile device, wherein the mobile device is distinguishable from the other mobile devices of a plurality of mobile devices within the facility according to the identity, wherein individual tracks of a plurality of tracks of the mobile devices within the facility are distinguishable according to identities of the plurality of mobile devices.

18. A non-transitory, machine-readable medium, comprising executable instructions that, when executed by a processing system including a processor, facilitate performance of operations, the operations comprising:
determining a location of a device;
obtaining an atmospheric pressure reading at the location of the device;
determining a position of the device according to the location of the device and the atmospheric pressure reading;
updating a historical record of positions of the device according to the position of the device;
combining the historical record of positions of the device with a map of a facility to obtain a pattern of movement of the device within the facility;
combining the pattern of movement of the device within the facility with patterns of movement of other devices within the facility to obtain a cumulative record of movement of a plurality of devices within the facility, the plurality of devices comprising the device and the other devices;
determining a subspace of the facility lacks any cumulative record of movement of a plurality of devices within the facility;
comparing the subspace to the map of the facility; and
identifying a hidden room responsive to the map of the facility lacking a defined feature corresponding to the subspace.

19. The non-transitory, machine-readable medium of claim 18, wherein the determining of the position of the device further comprise:
comparing the atmospheric pressure reading to a reference atmospheric pressure reading to obtain a pressure difference; and
determining, a height according to the pressure difference, wherein the position of the device is based on the location of the device and the height.

20. The non-transitory, machine-readable medium of claim 19, wherein the determining of the height comprises:
obtaining the reference atmospheric pressure reading from another pressure sensor at a defined height;

converting the reference atmospheric pressure reading to an equivalent atmospheric pressure at a reference height;
determining a corresponding height of the device above the reference height according to the atmospheric pressure reading and the equivalent atmospheric pressure at the reference height;
estimating a ground height at the location of the device to obtain an estimated ground height; and
determining a difference between the corresponding height of the device above the reference height and the estimated ground height to obtain a corresponding height of the device above ground.

\* \* \* \* \*